(12) United States Patent
Dudar

(10) Patent No.: US 11,041,452 B2
(45) Date of Patent: Jun. 22, 2021

(54) SYSTEMS AND METHODS FOR PRESSURE-BASED DIAGNOSTICS FOR TWO STAGE TURBO ENGINES

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 220 days.

(21) Appl. No.: 15/997,503

(22) Filed: Jun. 4, 2018

(65) Prior Publication Data

US 2019/0368431 A1 Dec. 5, 2019

(51) Int. Cl.
*F02M 33/02* (2006.01)
*F02D 41/00* (2006.01)
(Continued)

(52) U.S. Cl.
CPC ........... *F02D 41/003* (2013.01); *B60W 20/15* (2016.01); *F02D 41/0007* (2013.01);
(Continued)

(58) Field of Classification Search
CPC .... F02D 41/003; F02D 41/0007; F02D 43/04; F02D 2200/10; B60W 20/15; F02M 25/0818; F02M 25/0836; Y10S 903/905
(Continued)

(56) References Cited

U.S. PATENT DOCUMENTS 6,688,104 B2 * 2/2004 Baeuerle ............. F02D 13/0261
123/198 D
6,761,154 B2 * 7/2004 Takagi ............... F02M 25/0818
123/198 D
(Continued)

FOREIGN PATENT DOCUMENTS

JP H0610777 * 1/1994 ......... F02M 25/0809

OTHER PUBLICATIONS

Davies, A., "A Little Fan That Fixes the Turbocharger's Biggest Problem," Wired website, Available online at https://www.wired.com/2017/04/little-fan-fixes-turbochargers-biggest-problem/, Apr. 28, 2017, 7 pages.
(Continued)

*Primary Examiner* — Hung Q Nguyen
*Assistant Examiner* — Anthony Donald Taylor, Jr.
(74) *Attorney, Agent, or Firm* — Geoffrey Brumbaugh; McCoy Russell LLP

(57) ABSTRACT

Methods and systems are provided for conducting vehicle fuel system and/or evaporative emissions system diagnostics, where the diagnostics rely on a positive pressure with respect to atmospheric pressure. In one example, a method comprises activating an electric compressor positioned in an intake of an engine configured to receive purge gasses from the evaporative emissions system under boosted engine operation and natural engine operation, to direct a positive pressure with respect to atmospheric pressure to the fuel system and/or evaporative emission system to conduct said
(Continued)

diagnostic. In this way, diagnostics that rely on positive pressure with respect to atmospheric pressure may be conducted in vehicles with a dual-path purge system, without introduction of a pump in the evaporative emissions system.

18 Claims, 9 Drawing Sheets

(51) Int. Cl.
    *F02M 25/08* (2006.01)
    *B60W 20/15* (2016.01)
    *F02D 43/04* (2006.01)

(52) U.S. Cl.
    CPC ......... *F02D 43/04* (2013.01); *F02M 25/0818* (2013.01); *F02M 25/0836* (2013.01); *F02D 2200/10* (2013.01); *Y10S 903/905* (2013.01)

(58) Field of Classification Search
    USPC ....................................................... 123/520
    See application file for complete search history.

(56) References Cited

U.S. PATENT DOCUMENTS

| | | | | |
|---|---|---|---|---|
| 6,922,996 | B2 * | 8/2005 | Ellmer | F02B 37/04 123/565 |
| 7,284,530 | B2 * | 10/2007 | Nagasaki | F02M 25/0818 123/198 D |
| 7,444,234 | B2 | 10/2008 | Bauerle | |
| 8,271,183 | B2 * | 9/2012 | Uhrich | F02B 33/40 123/179.16 |
| 8,312,765 | B2 * | 11/2012 | Pursifull | F02M 25/0836 73/114.39 |
| 8,626,456 | B2 | 1/2014 | Moore et al. | |
| 8,739,766 | B2 | 6/2014 | Jentz et al. | |
| 8,950,244 | B2 * | 2/2015 | Nishimura | F02M 25/0809 73/47 |
| 9,739,244 | B2 | 8/2017 | Dudar | |
| 9,840,985 | B2 | 12/2017 | Martin et al. | |
| 2005/0011498 | A1 * | 1/2005 | Yoshiki | F02D 41/0045 123/520 |
| 2011/0307157 | A1 * | 12/2011 | Pursifull | F02D 41/0007 701/102 |
| 2013/0263590 | A1 * | 10/2013 | Kempf | F02M 25/0836 60/605.1 |
| 2014/0196694 | A1 * | 7/2014 | Euliss | F02M 25/08 123/520 |
| 2014/0251284 | A1 * | 9/2014 | Plymale | F02M 33/025 123/518 |
| 2014/0299110 | A1 * | 10/2014 | Heller | F02M 25/0809 123/520 |
| 2014/0318514 | A1 * | 10/2014 | Pursifull | F01M 13/022 123/568.29 |
| 2015/0114360 | A1 * | 4/2015 | Werner | F02M 25/089 123/520 |
| 2016/0201613 | A1 * | 7/2016 | Ulrey | F02M 25/0836 123/520 |
| 2016/0201615 | A1 * | 7/2016 | Pursifull | F02M 25/0836 123/520 |
| 2016/0290285 | A1 * | 10/2016 | Dudar | F02M 25/089 |
| 2016/0305352 | A1 * | 10/2016 | Pursifull | F02D 41/0007 |
| 2016/0341155 | A1 * | 11/2016 | Dudar | F02M 25/0836 |
| 2016/0377031 | A1 * | 12/2016 | Pursifull | F02M 25/0836 60/602 |
| 2017/0030271 | A1 * | 2/2017 | Dudar | F02D 13/0261 |
| 2017/0045007 | A1 * | 2/2017 | Pursifull | F02D 41/0032 |
| 2017/0096974 | A1 * | 4/2017 | Dudar | B60W 20/00 |
| 2017/0114744 | A1 * | 4/2017 | Martin | F02M 25/0818 |
| 2017/0138278 | A1 * | 5/2017 | Xiao | F02D 41/0005 |
| 2017/0145962 | A1 * | 5/2017 | Dudar | F02M 25/0836 |
| 2017/0276078 | A1 * | 9/2017 | Imaizumi | F02B 37/16 |

OTHER PUBLICATIONS

Dudar, A., "Evaporative Emissions System Diagnostic for GTDI Engines Using an Electronic Booster," U.S. Appl. No. 15/727,318, filed Oct. 6, 2017, 131 pages.

* cited by examiner

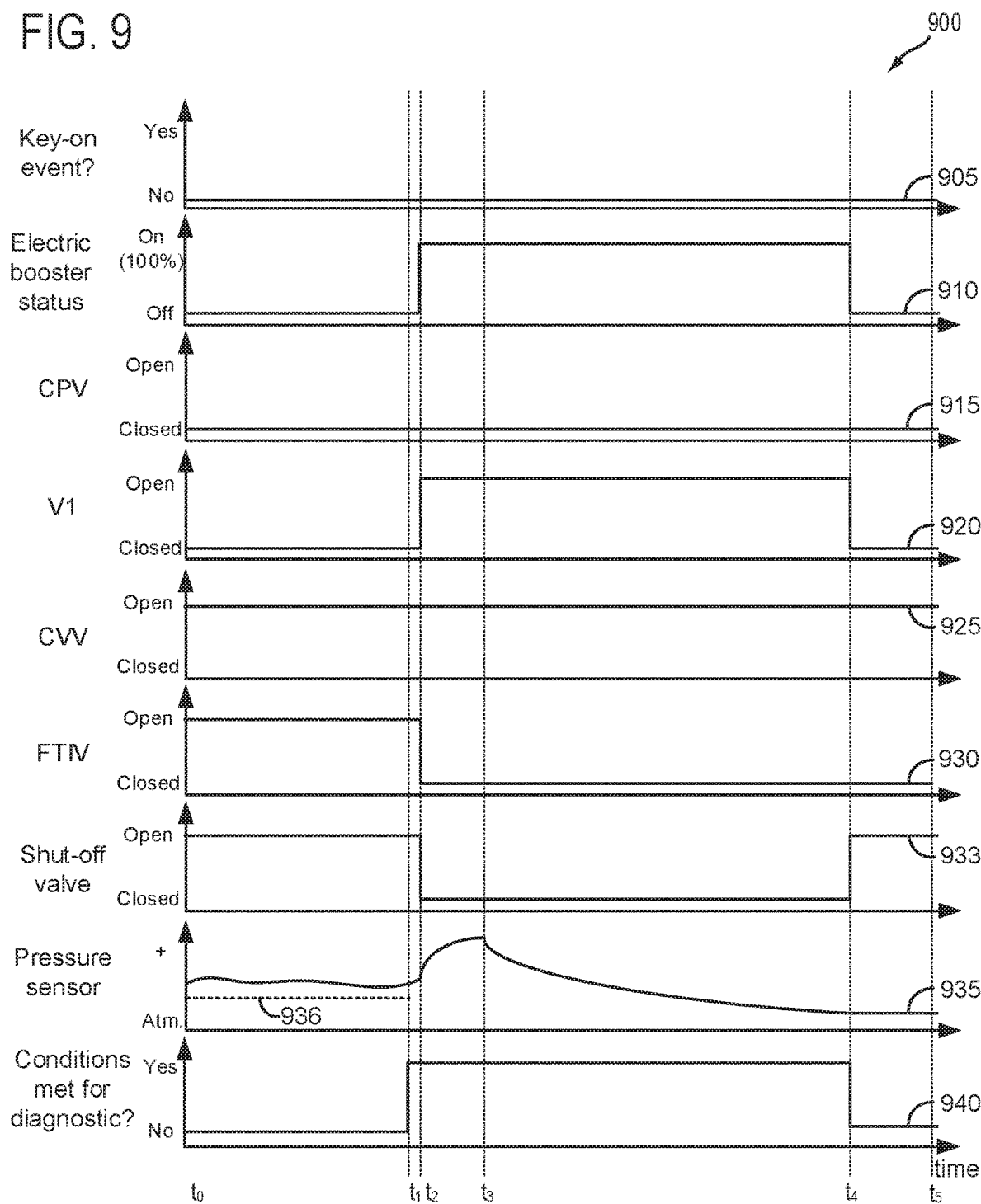

SYSTEMS AND METHODS FOR PRESSURE-BASED DIAGNOSTICS FOR TWO STAGE TURBO ENGINES

FIELD

The present description relates generally to methods and systems for conducting diagnostics in two state turbo engines that include ejector systems, using positive pressure with respect to atmospheric pressure during engine-off conditions.

BACKGROUND/SUMMARY

Vehicles may be fitted with evaporative emission control systems such as onboard fuel vapor recovery systems. Such systems capture and prevent release of vaporized hydrocarbons to the atmosphere, for example fuel vapors generated in a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emission control system allows the vapors to be purged into the engine intake manifold for use as fuel. The fuel vapor recovery system may include one more check valves, ejectors, and/or controller actuatable valves for facilitating purge of stored vapors under boosted or non-boosted engine operation.

Various approaches have been developed for detecting undesired fuel vapor evaporative emissions and/or degraded components in such fuel vapor recovery systems. However, the inventors have recognized several potential issues with such methods. For example, for hybrid electric vehicles (HEVs) and plug-in HEVs (PHEVs), engine run-time may be limited, and thus techniques such as engine off natural vacuum (EONV), which rely on heat rejection from the engine, may not be utilized to conduct tests for a presence or absence of undesired evaporative emissions stemming from the evaporative emissions system and/or a fuel system of the vehicle. To get around such an issue, a vacuum pump may be incorporated into the evaporative emissions system for conducting tests for undesired evaporative emissions. However, such a pump adds undesirable weight, and increases costs. Thus, systems and methods are desired to enable such diagnostic tests to be conducted via other means than introduction of a pump into the evaporative emissions system, in particular via use of components already included in a vehicle system.

Furthermore, for vehicle systems that are equipped to operate under boosted engine operation and which include an ejector system in a dual-path purge system, a negative pressure with respect to atmospheric pressure may be applied to the evaporative emissions system and fuel system, which may be used for fuel vapor canister purging and diagnostic operations when the engine is in operation to combust air and fuel. However, the inventors have herein additionally recognized that there may be circumstances where it may be desirable to conduct fuel system and/or evaporative emissions system diagnostics by introducing a positive pressure with respect to atmospheric pressure to the fuel system and/or evaporative emissions system, without inclusion of a vacuum pump in the evaporative emissions system, and under conditions where the engine is not combusting air and fuel. Such introduction of positive pressure to the evaporative emissions system and fuel system is not currently enabled in boosted vehicle systems that include dual path purge systems that do not include a vacuum pump in the evaporative emissions system.

Thus, the inventors have developed systems and methods to at least partially address the above-mentioned issues. In one example, a method is provided comprising receiving purge gasses from an evaporative emissions system selectively fluidically coupled to a fuel system, under boosted engine operation and natural aspiration engine operation, activating an electric compressor positioned in an engine intake to direct a positive pressure with respect to atmospheric pressure to the fuel system and/or evaporative emissions system, and conducting a diagnostic based on the positive pressure.

In this way, positive pressure may be directed to the fuel system and/or evaporative emissions system for conducting one or more diagnostics that rely on positive pressure, during engine-off conditions and without introducing a pump into the evaporative emissions system.

In one example, directing the positive pressure to the fuel system and/or evaporative emissions system includes directing the positive pressure through an ejector positioned in an ejector system, and then directing the positive pressure to the fuel system and/or evaporative emissions system.

In another example, directing the positive pressure to the fuel system and/or evaporative emissions system includes directing the positive pressure to the fuel system and/or evaporative emissions system without first directing the positive pressure through the ejector positioned in the ejector system.

The diagnostic relying on the positive pressure may include a test for a presence or absence of undesired evaporative emissions stemming from the fuel system and/or evaporative emissions system, a test to determine whether one or more quick connects that are utilized to coupled one or more fluid-carrying components of the fuel system and/or evaporative emissions system are latched or locked, or an air filter cleaning diagnostic where the positive pressure reduces an amount of dust and/or debris associated with the filter.

In some examples, the electric compressor speed may be variable for directing the positive pressure to the fuel system and/or evaporative emissions system as a function of the diagnostic relying on the positive pressure.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 9 depicts an example timeline for conducting the air filter cleaning diagnostic according to the method of FIG. 6.

DETAILED DESCRIPTION

Figure 1:
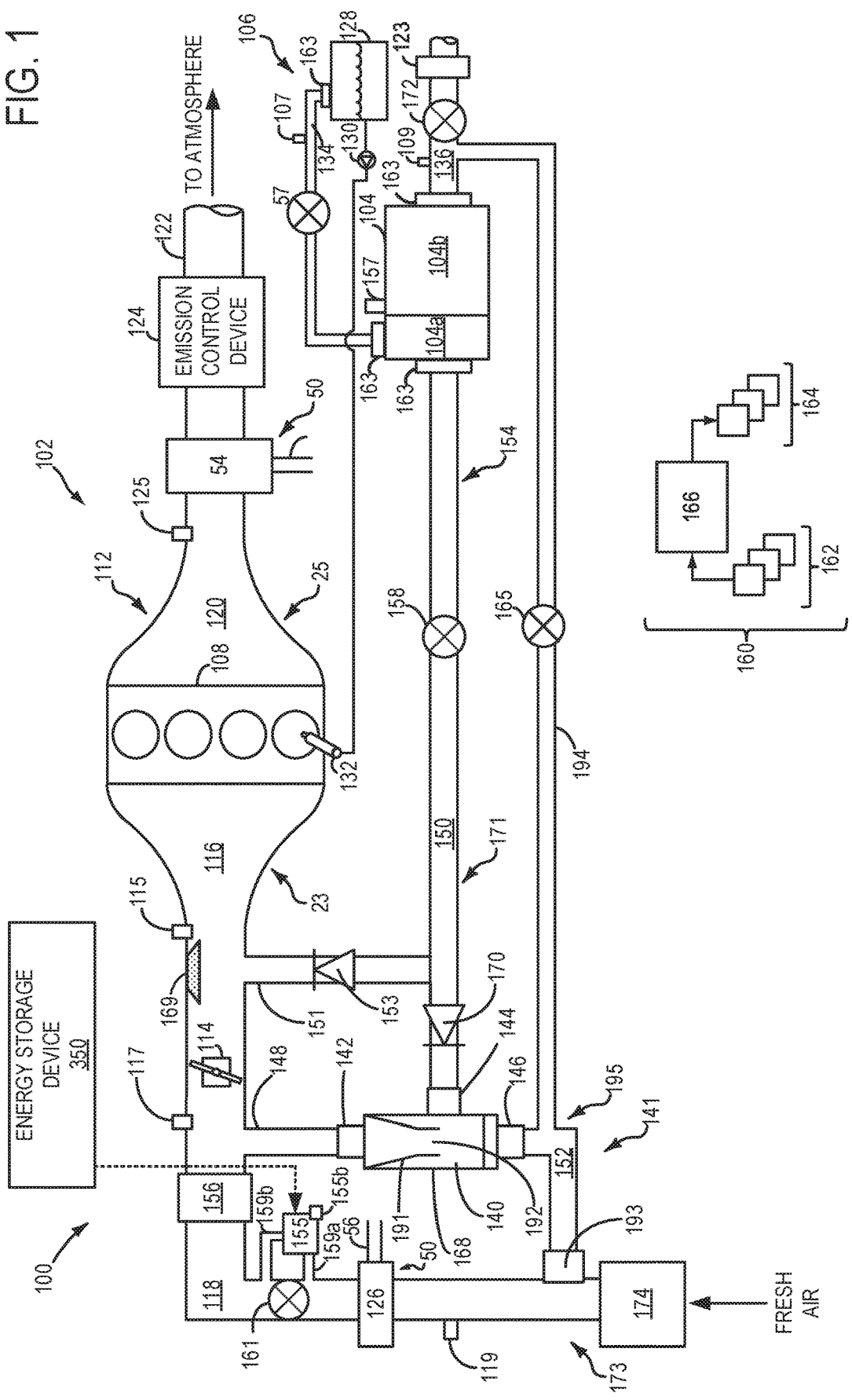
FIG. 1 shows a schematic diagram of a multi-path fuel vapor recovery system of a vehicle system.
Figure 2:
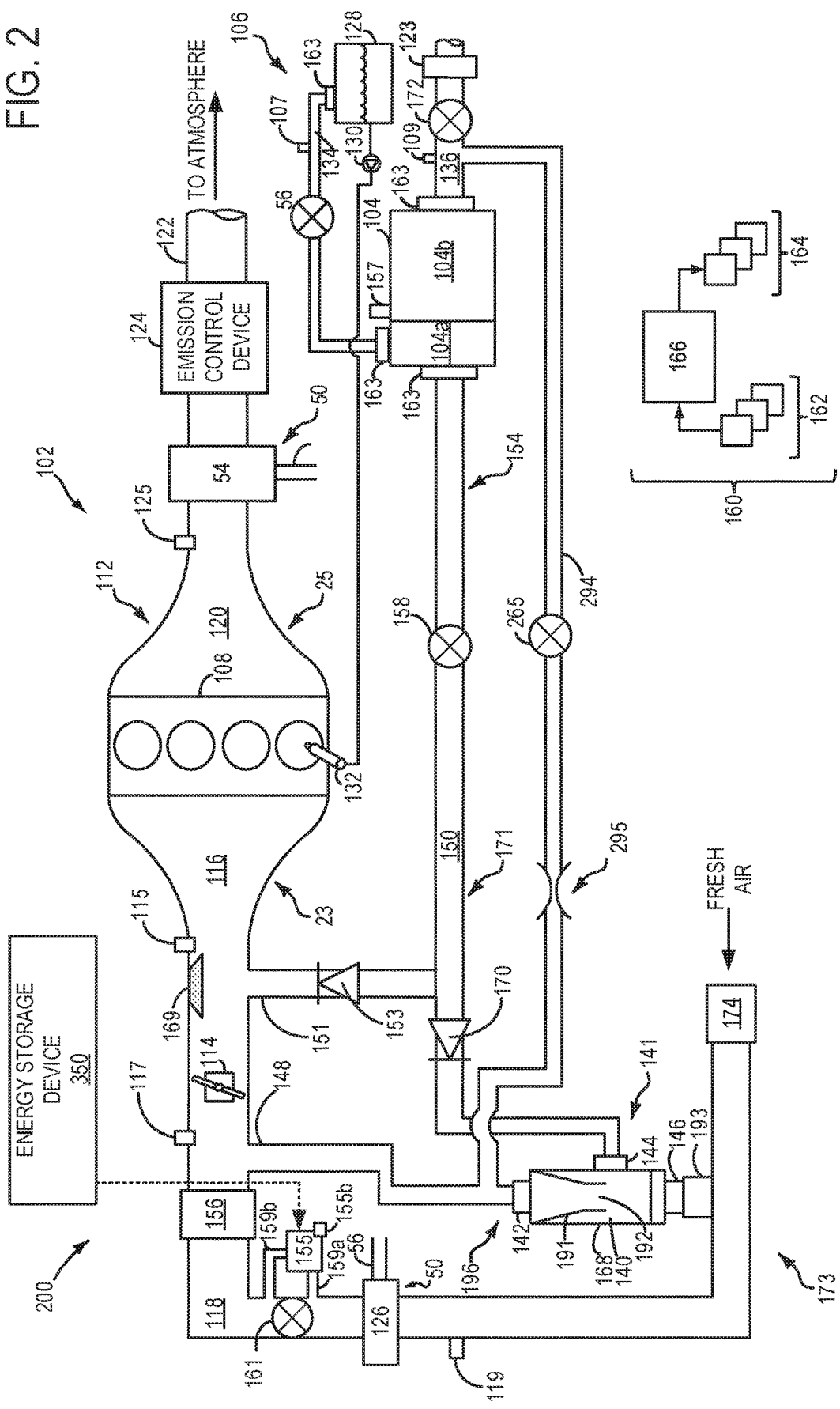
FIG. 2 shows another schematic diagram of a multi-path fuel vapor recovery system of a vehicle system.
Figure 4:
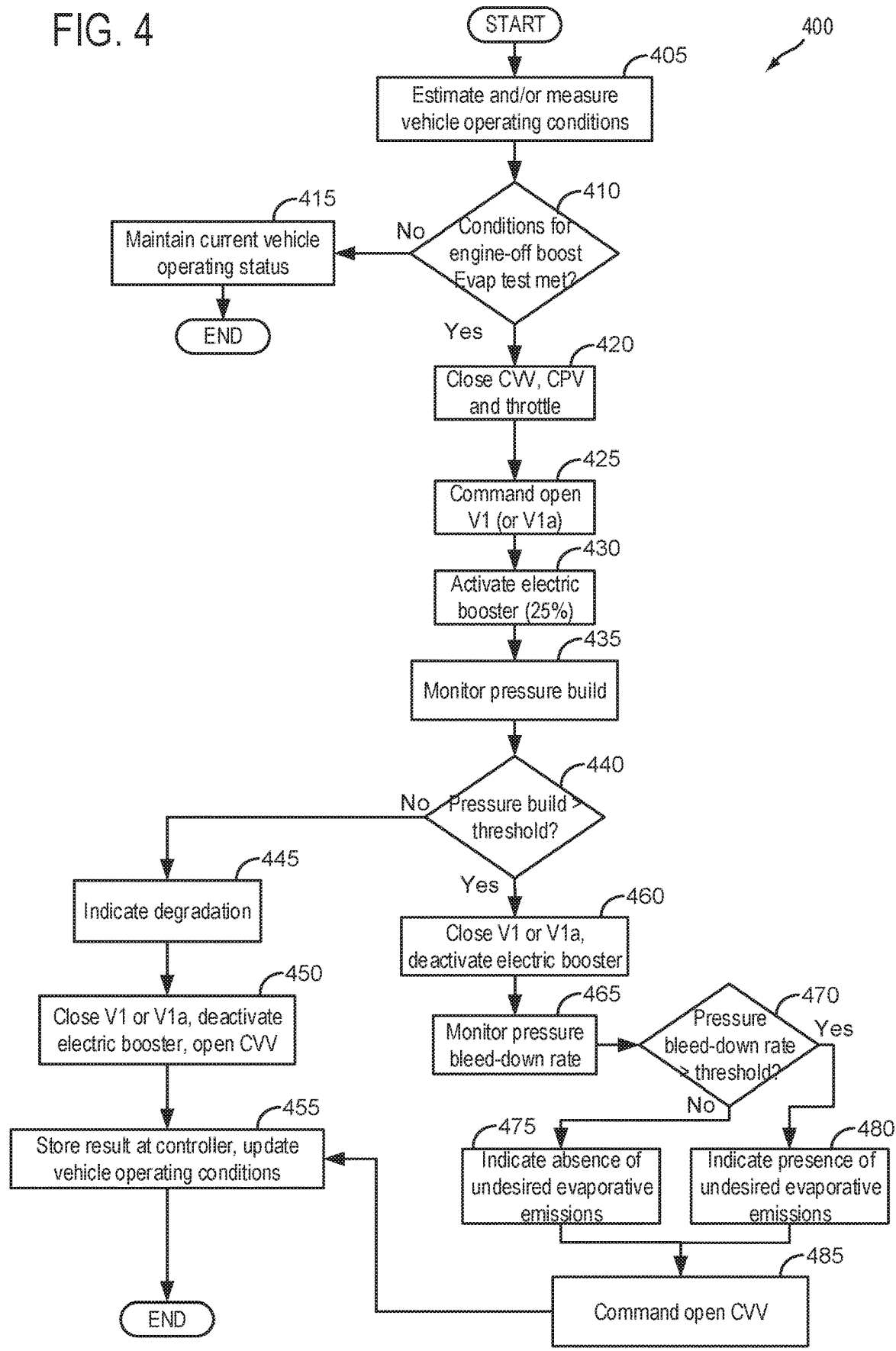
FIG. 4 depicts a flowchart for a high-level example method for conducting a diagnostic for a presence or absence of undesired evaporative emissions.
Figure 5:
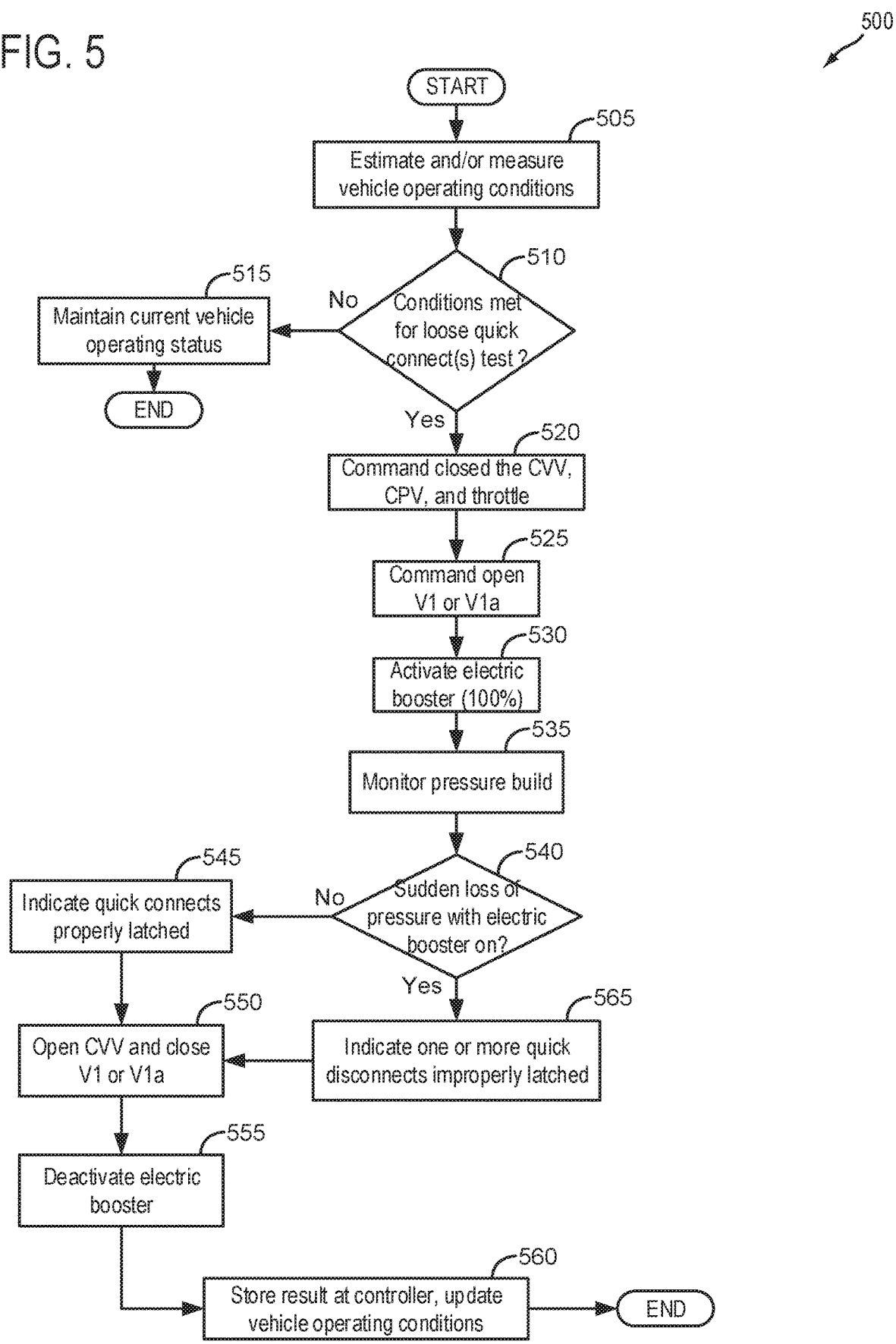
FIG. 5 depicts a flowchart for a high-level example method for conducting a diagnostic for determining whether one or more quick connects in a vehicle fuel system and/or evaporative emissions system are functioning as desired.
Figure 6:
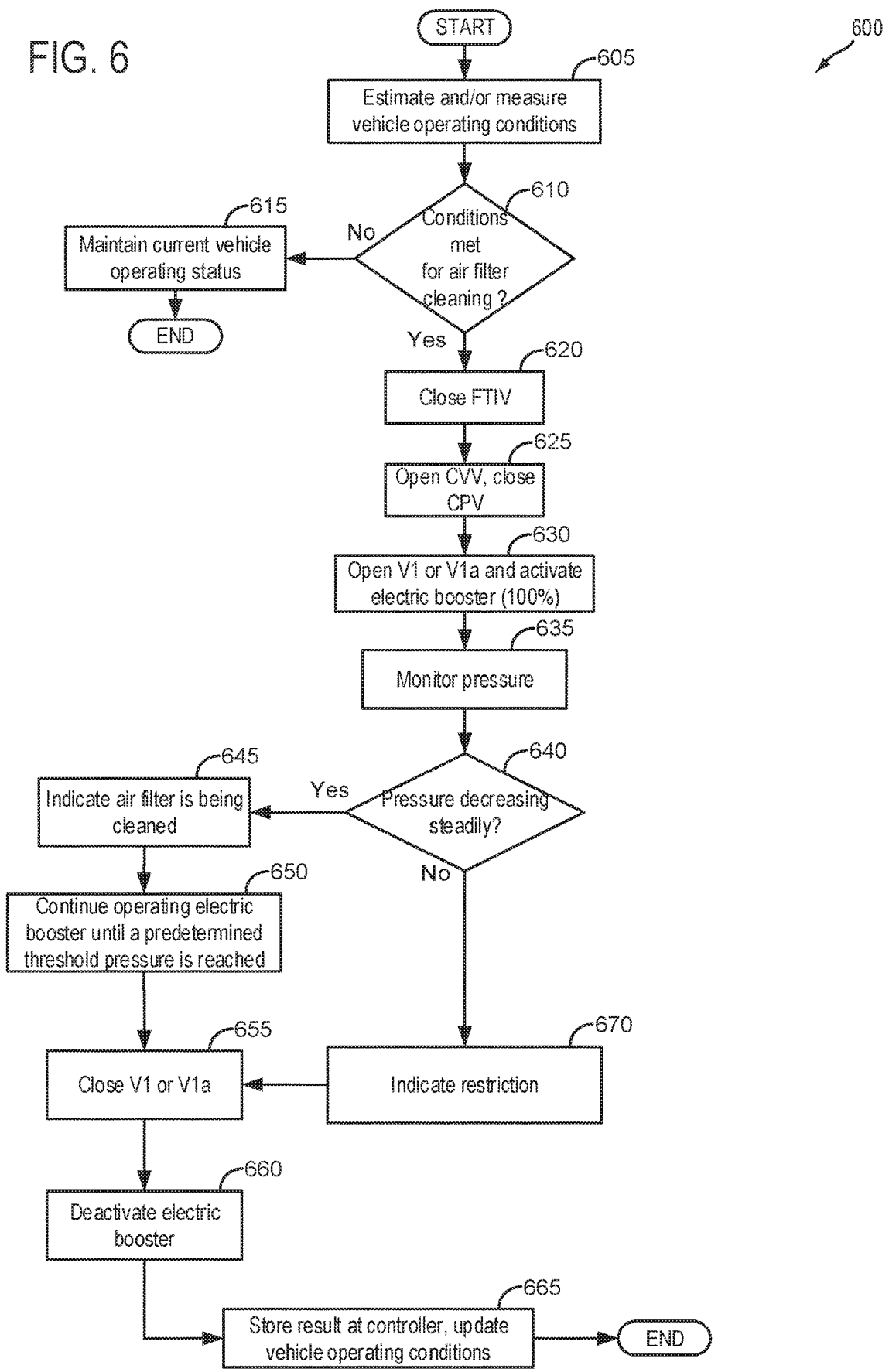
FIG. 6 depicts a flowchart for a high-level example method for conducting a cleaning diagnostic on an air filter positioned in a vent line of an evaporative emissions system.
Figure 7:
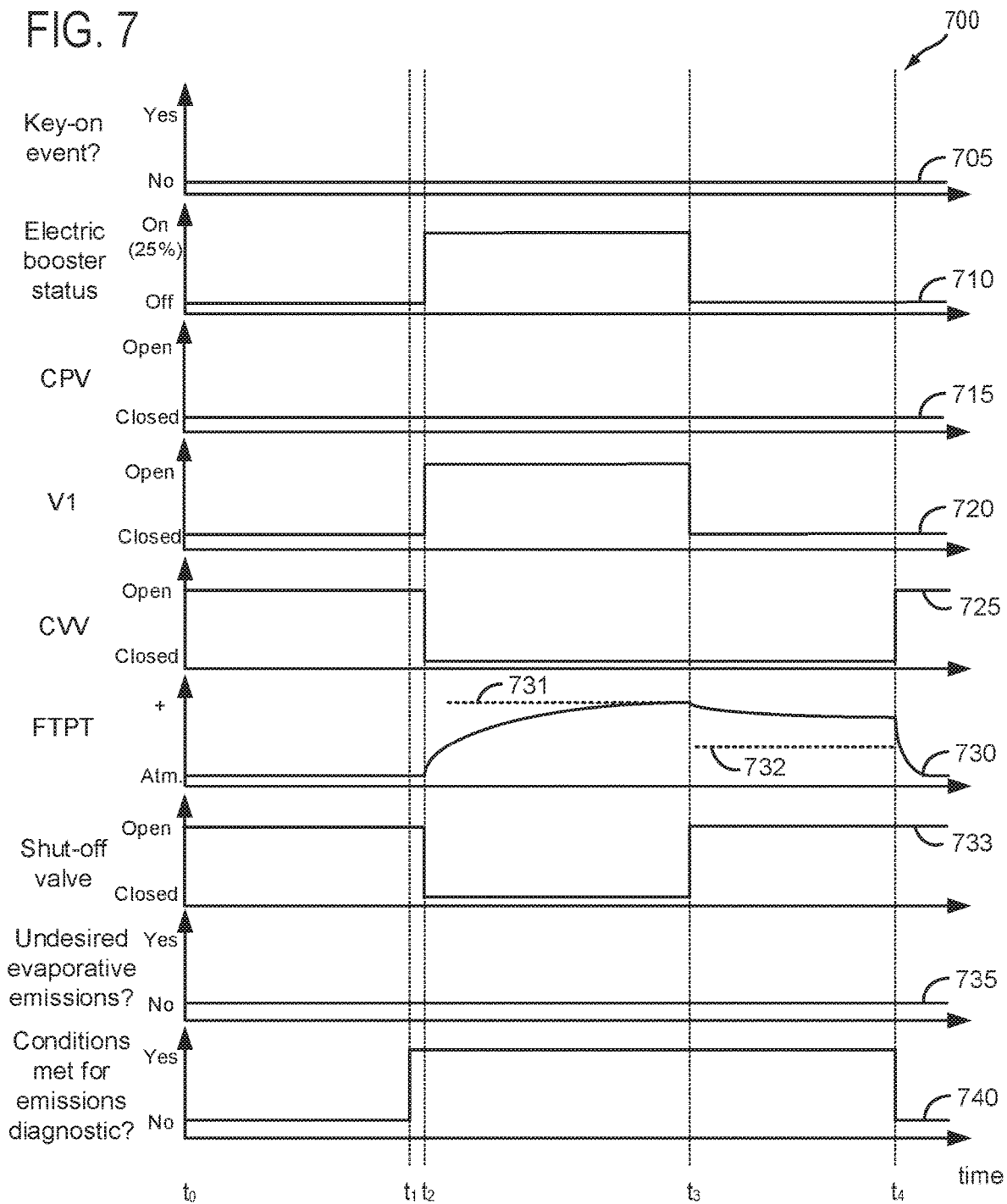
FIG. 7 depicts an example timeline for conducting the diagnostic for presence or absence of undesired evaporative emissions according to the method of FIG. 4.
Figure 8:
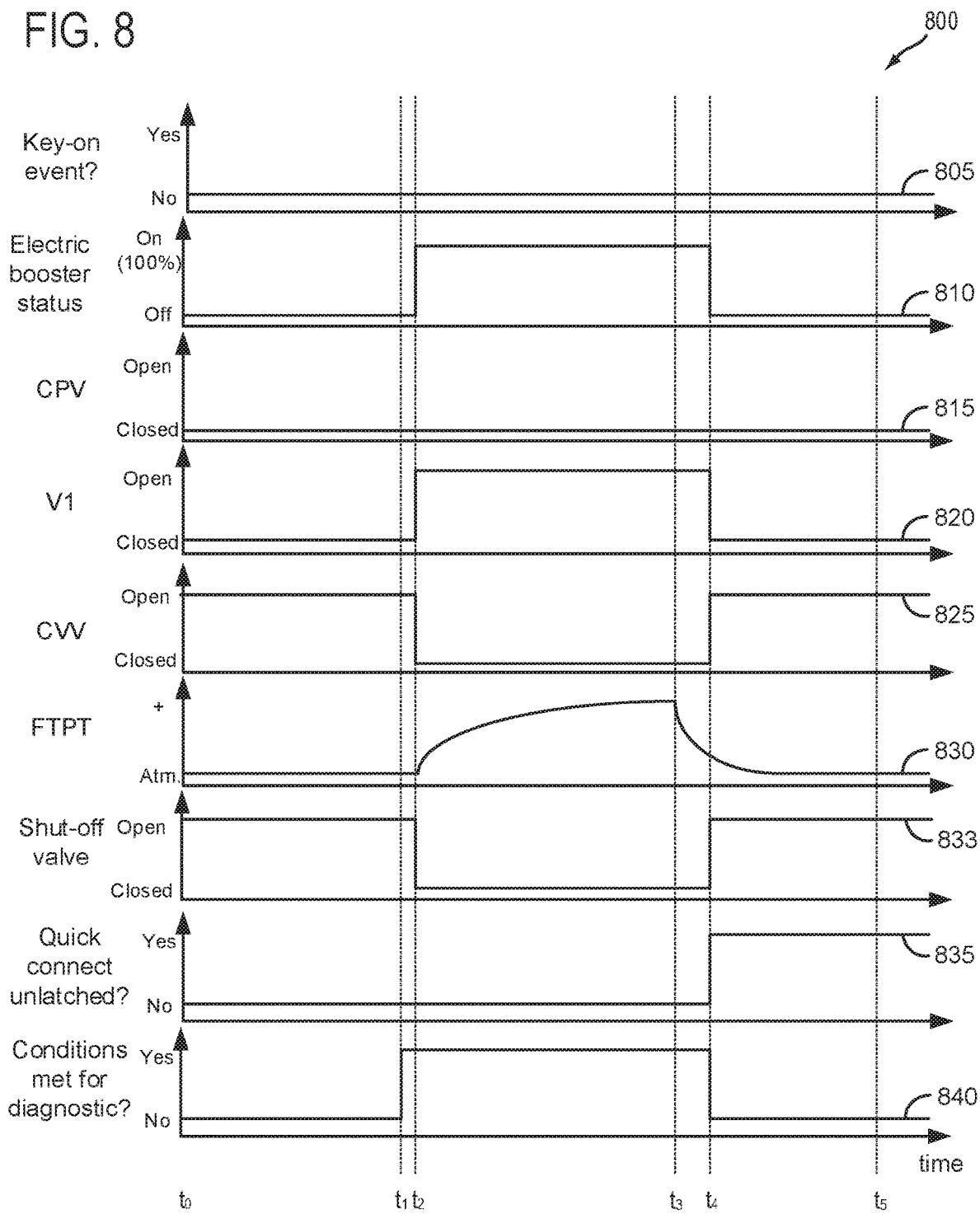
FIG. 8 depicts an example timeline for conducting the diagnostic for whether one or more quick connects are functioning as desired, according to the method of FIG. 5.

The following description relates to systems and methods for conducting one or more diagnostics on a vehicle fuel system and/or evaporative emissions system via introduction of a positive pressure with respect to atmosphere to the fuel system and/or evaporative emissions system, without introduction of a pump in the evaporative emissions system to provide the positive pressure. Specifically, the description relates to vehicle systems that are equipped with a dual-path purge systems, and which further comprise two-stage turbo engines. Such vehicle systems are depicted at FIGS. 1-2, and include an electric booster positioned in an intake of the engine, where the electric booster provides the source of positive pressure to the fuel system and/or evaporative emissions system via a conduit coupling the evaporative emissions system to a conduit either upstream or downstream of an ejector system. The positive pressure may thus be provided during engine-off conditions, and accordingly, the vehicle systems described above may comprise hybrid vehicle systems, such as the vehicle system depicted at FIG. 3. FIG. 4 depicts an example methodology for conducting a diagnostic for a presence or absence of undesired evaporative emissions stemming from a vehicle fuel system and/or evaporative emissions system of FIGS. 1-3, via the introduction of positive pressure to the fuel system and/or evaporative emissions system. FIG. 5 depicts an example methodology for conducting a diagnostic as to whether one or more quick connects are not properly latched or locked, via introduction of positive pressure to the evaporative emissions system of the vehicle systems depicted at FIGS. 1-3. FIG. 6 depicts an example methodology for conducting an air filter cleaning diagnostic via introduction of positive pressure to the evaporative emissions system of FIGS. 1-3. An example timeline for conducting the diagnostic for presence or absence of undesired evaporative emissions according to the method of FIG. 4, is depicted at FIG. 7. An example timeline for conducting the diagnostic as to whether one or more quick connects are not properly latched or locked, according to the method of FIG. 5, is depicted at FIG. 8. An example timeline for conducting the air filter cleaning diagnostic according to the method of FIG. 6, is depicted at FIG. 9.

Turning to the figures, FIG. 1 shows a schematic depiction of a vehicle system 100. The vehicle system 100 includes an engine system 102 coupled to a fuel vapor recovery system (evaporative emissions control system) 154 and a fuel system 106. The engine system 102 may include an engine 112 having a plurality of cylinders 108. In some examples, the vehicle system may be configured as a hybrid electric vehicle (HEV) or plug-in HEV (PHEV). Accordingly, an onboard energy storage device 350 may be included in the vehicle system 100. The onboard energy storage device 350 may comprise a high-voltage battery, capacitor, supercapacitor, etc. Details of componentry and operating conditions related to hybrid vehicle operation will be discussed in detail at FIG. 3. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine via a turbine bypass passage as controlled by wastegate (not shown). An amount of boost may additionally or optionally be controlled by controlling an amount of intake air directed through compressor 126. Controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

While turbochargers 50 are commonly used in gasoline turbo direct injection (GTDI) vehicles to boost power to the driven wheels, there may in some examples be a delay in time between a request for the boosted operation, and the delivery of torque. More specifically, as power from the turbocharger may utilize waste heat from the exhaust system, there may be a delay in turbo spooling, as torque from the exhaust pressure onto the exhaust turbine may first overcome rotational inertia of the turbine-compressor assembly, as well as friction and compressor load.

To assist the turbocharger, an electric booster 155 (eBooster) may be incorporated into the vehicle propulsion system. Electric booster 155 may be powered via an onboard energy storage device 350, which may comprise a battery, capacitor, supercapacitor, etc. In one example, electric booster 155 may be activated (actuated on) in response to a demand for wheel torque, in order to provide the desired boost air rapidly to the engine, without delay as may otherwise occur if the turbocharger 50 was utilized without the electric booster. In such an example, responsive to the turbocharger spooling up to a threshold speed (e.g. 70,000 rpm), the electric booster 155 may be actuated off, or deactivated. More specifically, operational control of the electric booster 155 may be under control of the vehicle controller (e.g. 166). For example, the controller may send a signal to an electric booster actuator 155b, which may actuate on the electric booster. In another example, the controller may send a signal to the electric booster actuator 155b, which may actuate off the electric booster. In one example the electric booster actuator may comprise a motor which drives the compression of air.

Electric booster 155 may be positioned between a first electric booster conduit 159a, and a second electric booster conduit 159b. First electric booster conduit 159a may fluidically couple intake passage 118 to electric booster 155 upstream of electric booster bypass valve 161. Second electric booster conduit 159b may fluidically couple electric booster 155 to intake passage 118 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 118 downstream of electric booster bypass valve 161. In this way, compressed air may be routed to engine intake 23.

In circumstances where the electric booster 155 is activated to provide boost more rapidly than if the turbocharger 50 were solely relied upon, it may be understood that electric booster bypass valve 161 may be commanded closed while electric booster 155 is activated. In this way, intake air may flow through turbocharger 50 and through electric booster 155. Once the turbocharger reaches the threshold speed, the electric booster 155 may be turned off, and the electric booster bypass valve 161 may be commanded open.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system (evaporative emissions control system) 154, described further below, via conduit 134, before being purged to the engine intake 23.

Fuel vapor recovery system 154 includes a fuel vapor retaining device or fuel vapor storage device, depicted herein as fuel vapor canister 104. Canister 104 may be filled with an adsorbent capable of binding large quantities of vaporized HCs. In one example, the adsorbent used is activated charcoal. Canister 104 may include a buffer 104a (or buffer region) and a non-buffer region 104b, each of the buffer 104a and the non-buffer region 104b comprising the adsorbent. The adsorbent in the buffer 104a may be the same as, or different from, the adsorbent in the non-buffer region 104b. As illustrated, the volume of buffer 104a may be smaller than (e.g. a fraction of) the volume of the non-buffer region 104b. Buffer 104a may be positioned within canister 104 such that during canister loading, fuel tank vapors are first adsorbed within the buffer, and then when the buffer is saturated, further fuel tank vapors are adsorbed in the non-buffer region 104b of canister 104. In comparison, during canister purging, fuel vapors may first be desorbed from the non-buffer region 104b (e.g., to a threshold amount) before being desorbed from the buffer 104a. In other words, loading and unloading of the buffer is not linear with the loading and unloading of the non-buffer region. As such, the effect of the canister buffer is to dampen any fuel vapor spikes flowing from the fuel tank to the canister, thereby reducing the possibility of any fuel vapor spikes going to the engine.

Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent line 136. In some examples, a canister vent valve 172 may be located along vent line 136, coupled between the fuel vapor canister and the atmosphere, and may adjust a flow of air and vapors between canister 104 and the atmosphere. In one example, operation of canister vent valve 172 may be regulated by a canister vent solenoid (not shown). For example, based on whether the canister is to be purged or not, the canister vent valve may be opened or closed. Furthermore, in some examples, one or more oxygen sensors may be positioned in the engine intake 116, or coupled to the canister 104 (e.g., downstream of the canister), to provide an estimate of canister load. In still further examples, one or more temperature sensors 157 may be coupled to and/or within canister 104. As will be discussed in further detail below, as fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load.

Conduit 134 may optionally include a fuel tank isolation valve 57. Among other functions, fuel tank isolation valve may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor recovery system 154 may include a dual path purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the duty cycle of an associated CPV solenoid (not shown). In one example, the duty cycle of the CPV solenoid may be determined by controller 166 responsive to engine operating conditions, including, for example, an air-fuel ratio. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent line 136. In this way, an increased amount of vaporized HCs may be stored in fuel vapor canister 104. During a later engine operation, the stored vapors may be released back into the incoming air charge via fuel vapor purging system 171.

In some examples, an air intake system hydrocarbon trap (AIS HC) 169 may be placed in the intake manifold of engine 112 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 169. In addition, fuel vapors stored during an engine shutdown can also be desorbed from the AIS HC during engine operation. In this way, AIS HC 169 may be continually loaded and purged, and the trap may reduce evaporative emissions from the intake passage even when engine 112 is shut down.

Conduit 150 is coupled to an ejector 140 in an ejector system 141 and includes a second check valve (CV2) 170 disposed therein between ejector 140 and CPV 158. Second check valve (CV2) 170 may prevent intake air from flowing through from the ejector into conduit 150, while allowing flow of air and fuel vapors from conduit 150 into ejector 140. CV2 170 may be a vacuum-actuated check valve, for example, that opens responsive to vacuum derived from ejector 140.

A conduit 151 couples conduit 150 to intake 23 at a position within conduit 150 between CV2 170 and CPV 158 and at a position in intake 23 downstream of throttle 114. For example, conduit 151 may be used to direct fuel vapors from canister 104 to intake 23 using vacuum generated in intake manifold 116 during a purge event. Conduit 151 may include a first check valve (CV1) 153 disposed therein. First check valve (CV1) 153 may prevent intake air from flowing through from intake manifold 116 into conduit 150, while allowing flow of fluid and fuel vapors from conduit 150 into intake manifold 116 via conduit 151 during a canister purging event. CV1 may be a vacuum actuated check valve, for example, that opens responsive to vacuum derived from intake manifold 116.

Conduit 148 may be coupled to ejector 140 at a first port or inlet 142. Ejector 140 includes a second port 144 or inlet coupling ejector 140 to conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

In some examples, a valve (V1) 165 may be configured to be selectively fluidically couple conduit 152 downstream 195 of ejector 140, and vent line 136 upstream of fuel vapor canister 104 but downstream of canister vent valve 172, via conduit 194. More specifically, as will be discussed in further detail below, there may be circumstances where positive pressure with respect to atmospheric pressure is present in conduit 152, which may be communicated to the evaporative emissions system via commanding open V1 165. V1 165 may be controlled via a V1 solenoid (not shown), where a command from the controller 166 of the vehicle to the V1 solenoid may actuate open or closed V1 165.

Ejector 140 may also be coupled to intake conduit 118 at a position upstream of compressor 126 via a shut-off valve 193. Shut-off valve 193 is hard-mounted directly to air induction system 173 along conduit 118 at a position between air filter 174 and compressor 126. For example, shut-off valve 193 may be coupled to an existing AIS nipple or other orifice, e.g., an existing SAE male quick connect port, in AIS 173. Hard-mounting may include a direct mounting that is inflexible. For example, an inflexible hard mount could be accomplished through a multitude of methods including spin welding, laser bonding, or adhesive. Shut-off valve 193 is configured to close in response to undesired emissions detected downstream of outlet 146 of ejector 140. As shown in FIG. 1, in some examples, a conduit or hose 152 may couple the third port 146 or outlet of ejector 140 to shut-off valve 193. In this example, if a disconnection of shut-off valve 193 with AIS 173 is detected, then shut-off valve 193 may close so air flow from the engine intake downstream of the compressor through the converging orifice in the ejector is discontinued. However, in other examples, shut-off valve 193 may be integrated with ejector 140 and directly coupled thereto. It may be understood that in some examples, shut-off valve 193 may be electronically actuatable to open and close, under control of the controller, for example.

Ejector 140 includes a housing 168 coupled to ports 146, 144, and 142. In one example, only the three ports 146, 144, and 142 are included in ejector 140. Ejector 140 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150 via port 144 during boosted operating conditions. In particular, a low pressure region is created adjacent to inlet port 144 which may be used to draw purge vapors from the canister into ejector 140.

Ejector 140 includes a nozzle 191 comprising an orifice which converges in a direction from inlet 142 toward suction inlet 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150 to assist in purging under various conditions, without being actively controlled. Thus, whereas CPV 158, V1 165, and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) and open or maintain open canister vent valve 172. For example, canister vent valve 172 may remain open except during vacuum/pressure tests performed on the system (described in further detail below). At the same time, controller 166 may adjust the duty cycle of the CPV solenoid (not shown) to control CPV 158. Pressures within fuel vapor purging system 171 may then draw fresh air through vent line 136, fuel vapor canister 104, and CPV 158 such that fuel vapors flow into conduit 150.

The operation of ejector 140 within fuel vapor purging system 171 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116. Further, at least a portion of the fuel vapors may flow from conduit 150 into ejector 140 via port 144. Upon entering the ejector via port 144, the fuel vapors may flow through nozzle 191 toward port 142. Specifically, the intake manifold vacuum causes the fuel vapors to flow through orifice 192. After passing through the nozzle, the fuel vapors exit ejector 140 through first port 142 and flow through duct 148 to intake passage 118 and then to intake manifold 116.

Next, the operation of ejector 140 within fuel vapor purging system 171 during boost conditions will be described. The boost conditions may include conditions during which the mechanical compressor (e.g. 126) and/or electric booster (e.g. 155) is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 and/or electric booster 155 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, in some examples. After the fluid flows into the ejector via the port 142, it flows through the converging orifice 192 in nozzle 191 in a direction from port 142 towards outlet 146. Because the diameter of the nozzle gradually decreases in a direction of this flow, a low pressure zone is created in a region of orifice 192 adjacent to suction inlet 144. The pressure in this low pressure zone may be lower than a pressure in duct 150. When present, this pressure differential provides a vacuum to conduit 150 to draw fuel vapor from canister 104. This pressure differential may further induce flow of fuel vapors from the fuel vapor canister, through the CPV (where the CPV is commanded open), and into port 144 of ejector 140. Upon entering the ejector, the fuel vapors may be drawn along with the fluid from the intake manifold out of the ejector via outlet port 146 and into intake 118 at a position upstream of compressor 126. Operation of compressor 126 then draws the fluid and fuel vapors from ejector 140 into intake passage 118 and through the compressor 126. After being compressed by compressor 126, the fluid and fuel vapors flow through charge air cooler 156, for delivery to intake manifold 116 via throttle 114. In examples where the electric booster is active, the fluid may travel through the compressor 126 and the electric booster 155, where electric booster bypass valve 161 may be closed. However, in other examples where the electric booster is not active, the fluid may travel through the compressor 126, to charge air cooler for delivery to intake manifold 116 via an open electric booster bypass valve 161. It may be understood that the above-described operation of ejector 140 during boost conditions relates to an engine-on condition, where the vehicle is in operation and the engine is combusting air and fuel. However, there may be other opportunities for operating the vehicle system under boost conditions, with the engine off. Such examples will be described in detail below.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. For example, a pressure or airflow sensor 115 in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. In some examples, pressure sensor 119 may comprise a dedicated barometric pressure sensor. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

In some examples, the controller may be placed in a reduced power mode or sleep mode, wherein the controller maintains essential functions only, and operates with lower battery consumption than in a corresponding awake mode. For example, the controller may be placed in a sleep mode following a vehicle-off event in order to perform a diagnostic routine at a duration following the vehicle-off event. The controller may have a wake input that allows the controller to be returned to an awake mode based on an input received from one or more sensors. In some examples, the controller may schedule a wake-up time, which may comprise setting a timer and when the timer elapses, the controller may be woken up from sleep mode.

Diagnostic tests may be periodically performed on the evaporative emissions control system 154 and fuel system 106 in order to indicate the presence or absence of undesired evaporative emissions. In one example, under natural aspiration conditions (e.g. intake manifold vacuum conditions) where the engine 112 is being operated to combust air and fuel, CVV 172 may be commanded closed, and CPV 158 may be commanded open. Furthermore, V1 165 may be commanded closed. By commanding closed CVV 172 and V1 165, and commanding open CPV 158 during natural aspiration conditions where the engine is in operation, the evaporative emissions control system 154 and fuel system 106 may be evacuated (e.g. a negative pressure with respect to atmospheric pressure) in order to ascertain the presence or absence of undesired evaporative emissions, by monitoring pressure in the fuel system and evaporative emissions control system. Pressure in the fuel system and evaporative emissions control system may be monitored, for example, via a pressure sensor 107. In some examples pressure sensor 107 may comprise a fuel tank pressure transducer (FTPT). In response to a threshold vacuum (e.g. negative pressure threshold with respect to atmospheric pressure) being reached during evacuating the evaporative emissions control system 154 and fuel system 106, the CPV 158 may be commanded closed and pressure in the fuel system and evaporative emissions system may be monitored. A pressure rise (e.g. bleed-up) greater than a predetermined pressure rise threshold, or a pressure rise rate (e.g. bleed-up rate) greater than a predetermined pressure rise rate threshold may indicate the presence of undesired evaporative emissions.

Another example includes a diagnostic test for the presence or absence of undesired evaporative emissions stemming from the fuel system and/or evaporative emissions system, under boost conditions (e.g. intake manifold pressure greater than barometric pressure by a predetermined threshold), where the engine is operating to combust air and fuel. In such an example, the CVV 172 may be commanded closed, and the CPV 158 may be commanded open. Furthermore, the V1 165 may be commanded closed. By commanding closed the CVV 172 and V1 165, and commanding open the CPV 158 during boost conditions where the engine is operating to combust air and fuel, the evaporative emissions control system 154 and fuel system 106 may be evacuated via the ejector system in order to ascertain the presence or absence of undesired evaporative emissions.

In such an example, during the evacuating the fuel system and evaporative emissions system, as discussed above, pressure in the fuel system and evaporative emissions control system may be monitored via, for example, pressure sensor 107. If the threshold vacuum (e.g. negative pressure threshold with respect to atmospheric pressure) is reached during evacuating the evaporative emissions control system 154 and fuel system 106, the CPV 158 may be commanded closed and pressure in the fuel system and evaporative emissions system may be monitored. A pressure rise (e.g. bleed-up) greater than a predetermined pressure rise threshold, or a pressure rise rate (e.g. bleed-up rate) greater than a predetermined pressure rise rate threshold may indicate the presence of undesired evaporative emissions.

In the above examples for conducting diagnostics for the presence or absence of undesired evaporative emissions during natural aspiration conditions or boost conditions with the engine operating to combust air and fuel, it may be understood that the fuel system may be coupled to the evaporative emissions system via commanding open the fuel tank isolation valve (FTIV) 57 (where included). However, it may be understood that in some examples a diagnostic for undesired evaporative emissions as described may only be conducted on the evaporative emissions system by commanding or maintaining the FTIV closed. In such an example, an evaporative emissions system pressure sensor 109 may be utilized to measure pressure in the evaporative emissions system.

While the above-described examples focus on natural aspiration conditions or boosted conditions where the engine is operating to combust air and fuel, to evacuate the evaporative emissions system and/or fuel system, it is herein recognized that in some examples it may be desirable to impart a positive pressure with respect to atmospheric pressure on the evaporative emissions system and/or fuel system to conduct diagnostics. Diagnostics relying on positive pressure with respect to atmospheric pressure may be less prone to noise disturbances than vacuum-based methods, for example. Furthermore, it may be desirable to conduct such diagnostics that rely on positive pressure during conditions where the engine is not combusting air and fuel, and without introducing a pump into the evaporative emissions system to conduct such a diagnostic.

Accordingly, an example includes, with the engine off, supplying air in the form of positive pressure with respect to atmospheric pressure to the intake manifold via operating the electric booster 155 via power supplied from the energy storage device 350. The CPV 158 may be commanded or maintained closed, and V1 165 may be commanded fully open. In this way, a source of positive pressure exiting the ejector 140 may be routed to the evaporative emissions system (and fuel system under conditions where the FTIV 57 is commanded open, where included) for conducting diagnostics. Such diagnostics will be discussed in further detail below. In such an example, to effectively direct the positive pressure through the ejector, the throttle 114 may be commanded closed, or substantially closed (e.g. less than 10% open).

Briefly, one diagnostic that may be desirable to conduct via positive pressure with respect to atmospheric pressure may include pressurizing the evaporative emissions system and fuel system to a particular threshold pressure, then sealing the evaporative emissions system and fuel system from atmosphere and measuring a rate or amount at which pressure bleeds down. If the rate or amount is greater than a threshold bleed down rate or threshold bleed down amount, then a presence of undesired evaporative emissions may be indicated.

Another diagnostic may include applying positive pressure to clean or reduce debris buildup in an air filter 123, or dust box, positioned in the vent line 136 upstream of the canister vent valve 172. For example, there may be conditions where it is indicated that the air filter 123 is clogged. Such an indication may be provided when venting of the evaporative emissions system is slower than expected when the canister vent valve 172 is commanded open under conditions where there is pressure in the evaporative emissions system. In other words, if the air filter were clean or free from debris, the pressure in the evaporative emissions system may be rapidly returned to atmospheric pressure. However, if the air filter is clogged, then it may take much longer than expected for the pressure to be returned to atmospheric pressure. In such an example, positive pressure may be provided to the evaporative emissions system via operating the electric booster as described above during engine-off conditions (e.g. command open V1 165). With the canister vent valve 172 commanded fully open (and the FTIV commanded closed, where included), and the CPV 158 commanded fully closed, the positive pressure may be directed to the air filter 123, which may thus push debris trapped in the air filter to atmosphere. In this way, an amount of debris, dust, etc., may be removed from the air filter, which may improve operations such as canister purging.

Another diagnostic may comprise a diagnostic for whether or not one or more quick connectors in the fuel system and/or evaporative emissions system are properly latched and locked. For example, quick connectors 163 may be used to couple different fuel system and/or evaporative emissions system components. More specifically, the canister 104 may be coupled to the purge line 150, the canister may be coupled to the vent line 136, the canister may be coupled to conduit 134, the fuel tank may be coupled to conduit 134, etc., via quick connectors 163. The quick connectors 163 may comprise two or more components which may be latched and locked together by a twist-lock mechanism. Each component may have fitting ports for coupling with fuel system and/or evaporative emissions system components. If one or more of the quick connectors are not properly latched or locked, then application of positive pressure to the evaporative emissions system and/or fuel system may enable a determination as to such a condition. More specifically, positive pressure may build in the evaporative emissions system and/or fuel system, until a certain point where the one or more quick connectors open, which may be indicated via a rapid decrease in pressure in the evaporative emissions system and/or fuel system. Accordingly, such a diagnostic may include applying the positive pressure via commanding on the electric booster 155, commanding closed the throttle 114, commanding/maintaining closed the CPV 158, commanding fully open the V1, and commanding fully closed the canister vent valve 172. Such a diagnostic will be discussed in further detail below.

The above-discussed diagnostics may be enabled by the vehicle system of FIG. 1. However, there may be other examples of a vehicle system which may enable such diagnostics to be conducted, without departing from the scope of this disclosure. Turning now to FIG. 2, such an example vehicle system 200 is shown. Vehicle system 200 includes nearly all of the same components as vehicle system 100 depicted above, and such components that are the same between vehicle system 100 and vehicle system 200 are depicted as like numerals.

FIG. 2 depicts a vehicle system where the ejector 140 is welded to the AIS 173. In such an example, conduit 294 selectively couples conduit 148 upstream 196 of ejector 140 to vent line 136 via valve V1a 265. In this example, the diagnostics discussed above may all be conducted in similar fashion. Specifically, with regard to the diagnostics conducted via operating the electric booster 155, the positive pressure in conduit 148 due to operating the electric booster 155 may be directed to the evaporative emissions system and/or fuel system via commanding open V1a 265. To regulate an amount of flow to the evaporative emissions system and fuel system (e.g. prevent such flow of positive pressure from being above a set threshold), a restriction orifice 295 may be plumbed into conduit 294 between V1a 265 and conduit 148. In some examples, the restriction orifice 295 may comprise a variable restriction orifice, under control of the vehicle controller. In other examples, the restriction orifice may be of a fixed size, and may be sized in order to limit an overall amount of air flow to the evaporative emissions system and fuel system, as a function of maximum electric booster speed. For example, the orifice may be sized in order to prevent pressure in the fuel system and/or evaporative emissions system from reaching or exceeding a predetermined threshold pressure, when the electric booster is activated at its maximum speed.

Figure 3:
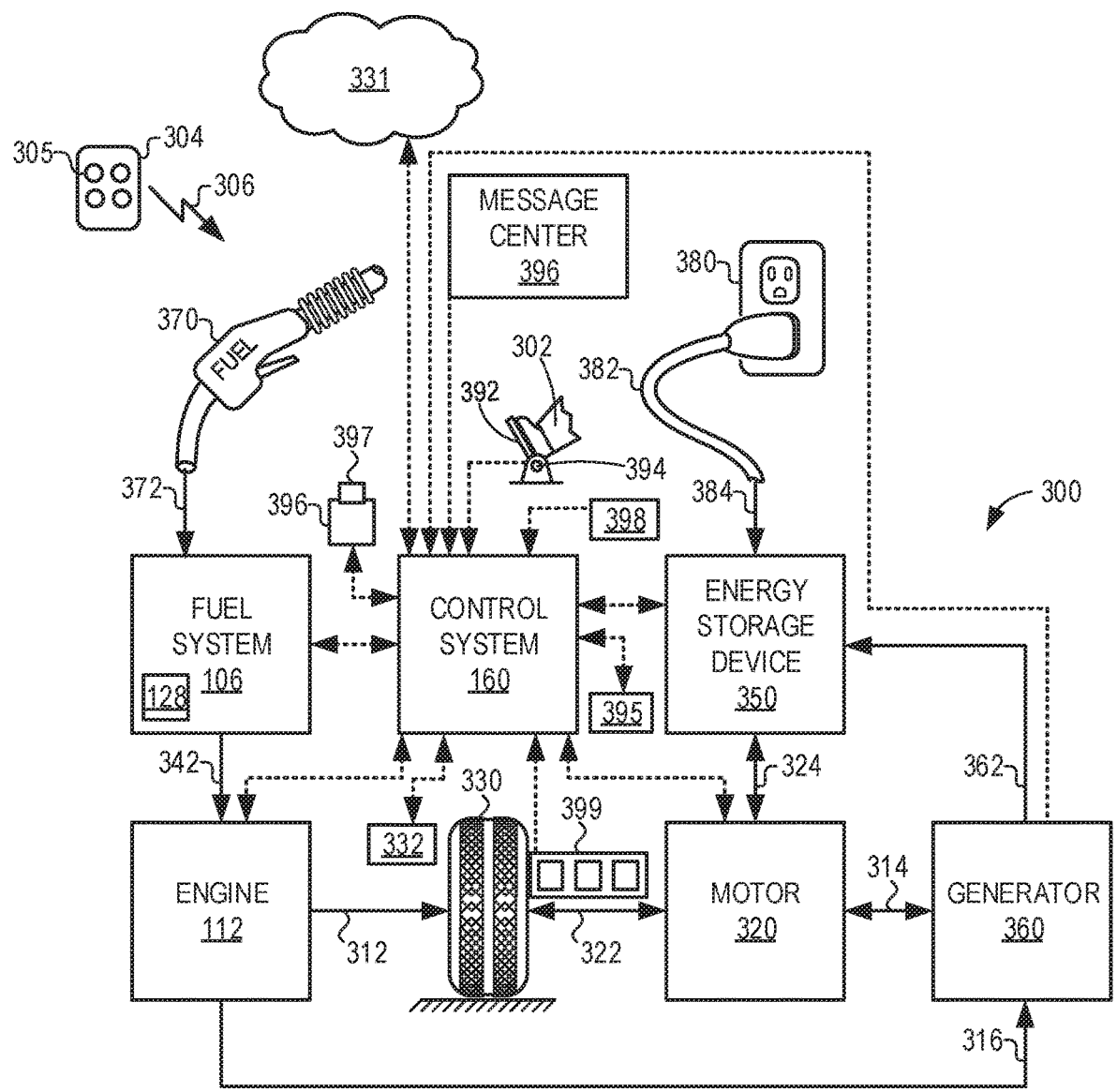
FIG. 3 shows a high-level block diagram illustrating an example vehicle system.

FIG. 3 illustrates an example vehicle propulsion system 300. It may be understood that vehicle propulsion system 300 may comprise the same vehicle propulsion system as vehicle propulsion system 100 depicted at FIG. 1 and vehicle propulsion system 200 depicted at FIG. 2. Vehicle propulsion system 300 includes a fuel burning engine 112 and a motor 320. As a non-limiting example, engine 112 comprises an internal combustion engine and motor 320 comprises an electric motor. Motor 320 may be configured to utilize or consume a different energy source than engine 112. For example, engine 112 may consume a liquid fuel (e.g., gasoline) to produce an engine output while motor 320 may consume electrical energy to produce a motor output. As such, a vehicle with propulsion system 300 may be referred to as a hybrid electric vehicle (HEV).

Vehicle propulsion system 300 may utilize a variety of different operational modes depending on operating conditions encountered by the vehicle propulsion system. Some of these modes may enable engine 112 to be maintained in an off state (i.e., set to a deactivated state) where combustion of fuel at the engine is discontinued. For example, under select operating conditions, motor 320 may propel the vehicle via drive wheel 330 as indicated by arrow 322 while engine 112 is deactivated.

During other operating conditions, engine 112 may be set to a deactivated state (as described above) while motor 320 may be operated to charge energy storage device 350. For example, motor 320 may receive wheel torque from drive wheel 330 as indicated by arrow 322 where the motor may convert the kinetic energy of the vehicle to electrical energy for storage at energy storage device 350 as indicated by arrow 324. This operation may be referred to as regenerative braking of the vehicle. Thus, motor 320 can provide a generator function in some examples. However, in other examples, generator 360 may instead receive wheel torque from drive wheel 330, where the generator may convert the kinetic energy of the vehicle to electrical energy for storage at energy storage device 350 as indicated by arrow 362.

During still other operating conditions, engine 112 may be operated by combusting fuel received from fuel system 106 as indicated by arrow 342. For example, engine 112 may be operated to propel the vehicle via drive wheel 330 as indicated by arrow 212 while motor 320 is deactivated. During other operating conditions, both engine 112 and motor 320 may each be operated to propel the vehicle via drive wheel 330 as indicated by arrows 312 and 322, respectively. A configuration where both the engine and the motor may selectively propel the vehicle may be referred to as a parallel type vehicle propulsion system. Note that in some examples, motor 320 may propel the vehicle via a first set of drive wheels and engine 112 may propel the vehicle via a second set of drive wheels.

In other examples, vehicle propulsion system 300 may be configured as a series type vehicle propulsion system, whereby the engine does not directly propel the drive wheels. Rather, engine 112 may be operated to power motor 320, which may in turn propel the vehicle via drive wheel 330 as indicated by arrow 322. For example, during select operating conditions, engine 112 may drive generator 360 as indicated by arrow 316, which may in turn supply electrical energy to one or more of motor 320 as indicated by arrow 314 or energy storage device 350 as indicated by arrow 362. As another example, engine 112 may be operated to drive motor 320 which may in turn provide a generator function to convert the engine output to electrical energy, where the electrical energy may be stored at energy storage device 350 for later use by the motor.

Fuel system 106 may include one or more fuel storage tanks 128 for storing fuel on-board the vehicle. For example, fuel tank 128 may store one or more liquid fuels, including but not limited to: gasoline, diesel, and alcohol fuels. In some examples, the fuel may be stored on-board the vehicle as a blend of two or more different fuels. For example, fuel tank 128 may be configured to store a blend of gasoline and ethanol (e.g., E10, E85, etc.) or a blend of gasoline and methanol (e.g., M10, M85, etc.), whereby these fuels or fuel blends may be delivered to engine 112 as indicated by arrow 342. Still other suitable fuels or fuel blends may be supplied to engine 112, where they may be combusted at the engine to produce an engine output. The engine output may be utilized to propel the vehicle as indicated by arrow 212 or to recharge energy storage device 350 via motor 320 or generator 360.

In some examples, energy storage device 350 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 350 may include one or more batteries and/or capacitors.

Control system 160 may communicate with one or more of engine 112, motor 320, fuel system 106, energy storage device 350, and generator 360. Control system 160 may receive sensory feedback information from one or more of engine 112, motor 320, fuel system 106, energy storage device 350, and generator 360. Further, control system 160 may send control signals to one or more of engine 112, motor 320, fuel system 106, energy storage device 350, and generator 360 responsive to this sensory feedback. Control system 160 may receive an indication of an operator requested output of the vehicle propulsion system from a vehicle operator 302. For example, control system 160 may receive sensory feedback from pedal position sensor 394 which communicates with pedal 392. Pedal 392 may refer schematically to a brake pedal and/or an accelerator pedal. Furthermore, in some examples control system 160 may be in communication with a remote engine start receiver 395 (or transceiver) that receives wireless signals 306 from a key fob 304 having a remote start button 305. In other examples (not shown), a remote engine start may be initiated via a cellular telephone, or smartphone based system where a user's cellular telephone sends data to a server and the server communicates with the vehicle to start the engine.

Energy storage device 350 may periodically receive electrical energy from a power source 380 residing external to the vehicle (e.g., not part of the vehicle) as indicated by arrow 384. As a non-limiting example, vehicle propulsion system 300 may be configured as a plug-in hybrid electric vehicle (PHEV), whereby electrical energy may be supplied to energy storage device 350 from power source 380 via an electrical energy transmission cable 382. During a recharging operation of energy storage device 350 from power source 380, electrical transmission cable 382 may electrically couple energy storage device 350 and power source 380. While the vehicle propulsion system is operated to propel the vehicle, electrical transmission cable 382 may disconnected between power source 280 and energy storage device 350. Control system 160 may identify and/or control the amount of electrical energy stored at the energy storage device, which may be referred to as the state of charge (SOC).

In other examples, electrical transmission cable 382 may be omitted, where electrical energy may be received wirelessly at energy storage device 350 from power source 380. For example, energy storage device 350 may receive electrical energy from power source 380 via one or more of electromagnetic induction, radio waves, and electromagnetic resonance. As such, it may be appreciated that any suitable approach may be used for recharging energy storage device 350 from a power source that does not comprise part of the vehicle. In this way, motor 320 may propel the vehicle by utilizing an energy source other than the fuel utilized by engine 112.

Fuel system 106 may periodically receive fuel from a fuel source residing external to the vehicle. As a non-limiting example, vehicle propulsion system 300 may be refueled by receiving fuel via a fuel dispensing device 370 as indicated by arrow 372. In some examples, fuel tank 128 may be configured to store the fuel received from fuel dispensing device 370 until it is supplied to engine 112 for combustion. In some examples, control system 160 may receive an indication of the level of fuel stored at fuel tank 128 via a fuel level sensor. The level of fuel stored at fuel tank 128 (e.g., as identified by the fuel level sensor) may be communicated to the vehicle operator, for example, via a fuel gauge or indication in a vehicle instrument panel 396.

The vehicle propulsion system 300 may also include an ambient temperature/humidity sensor 398, and a roll stability control sensor, such as a lateral and/or longitudinal and/or yaw rate sensor(s) 399. The vehicle instrument panel 396 may include indicator light(s) and/or a text-based display in which messages are displayed to an operator. The vehicle instrument panel 396 may also include various input portions for receiving an operator input, such as buttons, touch screens, voice input/recognition, etc. For example, the vehicle instrument panel 396 may include a refueling button 397 which may be manually actuated or pressed by a vehicle operator to initiate refueling. For example, in response to the vehicle operator actuating refueling button 397, a fuel tank in the vehicle may be depressurized so that refueling may be performed.

Control system 160 may be communicatively coupled to other vehicles or infrastructures using appropriate communications technology, as is known in the art. For example, control system 160 may be coupled to other vehicles or infrastructures via a wireless network 331, which may comprise Wi-Fi, Bluetooth, a type of cellular service, a wireless data transfer protocol, and so on. Control system 160 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 160 may be communicatively coupled to other vehicles or infrastructures via a wireless network 331 and the internet (e.g. cloud), as is commonly known in the art.

Vehicle system 300 may also include an on-board navigation system 332 (for example, a Global Positioning System) that an operator of the vehicle may interact with. The navigation system 332 may include one or more location sensors for assisting in estimating vehicle speed, vehicle altitude, vehicle position/location, etc. This information may be used to infer engine operating parameters, such as local barometric pressure. As discussed above, control system 160 may further be configured to receive information via the internet or other communication networks. Information received from the GPS may be cross-referenced to information available via the internet to determine local weather conditions, local vehicle regulations, etc.

Thus, the systems described above may enable a system for a hybrid vehicle comprising an evaporative emissions system selectively fluidically coupled to a fuel system via a fuel tank isolation valve, the evaporative emissions system including a fuel vapor storage canister selectively fluidically coupled to atmosphere via a canister vent valve positioned in a vent line, and selectively fluidically coupled to an intake of an engine via a dual-path fuel vapor canister purge system that includes at least a canister purge valve and an ejector system including an ejector. The system may further include a throttle positioned in the intake of the engine. The system may further include a first conduit (e.g. 194) that selectively fluidically couples the vent line (e.g. 136) of the evaporative emissions system at a position between the fuel vapor storage canister and the canister vent valve, to a second conduit (e.g. 152) that fluidically couples the ejector system to an air induction system, the first conduit selectively fluidically coupling the vent line to the second conduit via a first valve (e.g. 165). The system may further include an electric compressor positioned in an intake passage of the engine. The system may further include a shut-off valve (e.g. 193) positioned downstream of the ejector system between the ejector system and the air induction system, and a pressure sensor configured to measure pressure in the fuel system and/or evaporative emissions system. The system may further include a controller with computer readable instructions stored on non-transitory memory that when executed, cause the controller to command fully open the first valve and command closed the throttle, canister purge valve, and the shut-off valve, and activate the electric compressor to route a positive pressure with respect to atmospheric pressure to the evaporative emissions system in order to conduct a diagnostic that relies on the positive pressure.

As an example, the system may further comprise an air filter positioned in the vent line between the canister vent valve and atmosphere. In such an example, the controller may store further instructions to command closed the fuel tank isolation valve, and command open the canister vent valve just prior to (e.g. within 10 seconds or less, or within 5 seconds or less) routing the positive pressure to the evaporative emissions system, and in response to an indication via the pressure sensor that pressure in the evaporative emissions system is steadily decreasing during the routing, continue the routing until pressure in the evaporative emissions system is within a threshold (e.g. within 10% or less) of atmospheric pressure. In such an example, the controller may store further instructions to activate the electric booster at a speed greater than or equal to 90% of its maximum speed to route the positive pressure to the evaporative emissions system.

As another example, the system may further comprise one or more quick connects to couple one or more fluid-carrying components of the fuel system and/or evaporative emissions system. In such an example, the controller may store further instructions to command closed the canister vent valve, and command open the fuel tank isolation valve just prior (e.g. within 10 seconds or less, or within 5 seconds or less) to routing the positive pressure to the evaporative emissions system, and indicate that the one or more quick connects are not properly latched or locked in response to a rapid decrease in pressure in the evaporative emissions system and fuel system during the routing. In such an example, the controller may store further instructions to activate the electric booster at a speed greater than or equal to 90% of its maximum speed to route the positive pressure to the evaporative emissions system.

In another example of the system, the engine may not be combusting air and fuel while the electric compressor is activated to route the positive pressure to the evaporative emissions system.

In such a system, the controller may store further instructions to, just prior to (e.g. within 10 seconds or less, or within 5 seconds or less) routing the positive pressure to the evaporative emissions system, command closed the canister vent valve, and command open the fuel tank isolation valve. In such an example, in response to a positive pressure threshold being reached in the evaporative emissions system and the fuel system during the routing, the controller may command fully closed the first valve and indicate an absence of a source of undesired evaporative emissions stemming from the fuel system and the evaporative emissions system in response to pressure in the evaporative emissions system remaining above a pressure bleed down threshold for a predetermined time period.

Another example of a system for a hybrid vehicle comprises an evaporative emissions system selectively fluidically coupled to a fuel system via a fuel tank isolation valve, the evaporative emissions system including a fuel vapor storage canister selectively fluidically coupled to atmosphere via a canister vent valve positioned in a vent line, and selectively fluidically coupled to an intake of an engine via a dual-path fuel vapor canister purge system that includes at least a canister purge valve and an ejector system including an ejector. The system may further include a throttle positioned in the intake of the engine, and a shut-off valve (e.g. 193) positioned between the ejector system and an air induction system. The system may further include a first conduit (e.g. 294) that selectively fluidically couples the vent line of the evaporative emissions system at a position between the fuel vapor storage canister and the canister vent valve, to a second conduit (e.g. 148) that fluidically couples the ejector system to an intake passage of the engine at a position between a charge air cooler and a throttle positioned in the intake passage, the first conduit selectively fluidically coupling the vent line to the second conduit via a first valve (e.g. 265) and further including a restriction orifice (e.g. 295) between the first valve and the second conduit. The system may further include a controller with computer readable instructions stored on non-transitory memory that when executed, cause the controller to, with the engine not combusting air and fuel, command fully open the first valve, command closed the throttle, canister purge valve, and shut-off valve, and activate the electric compressor to route a positive pressure with respect to atmospheric pressure to the evaporative emissions system in order to conduct a diagnostic that relies on the positive pressure.

In an example of the system, an outlet of the ejector is welded to the air induction system.

In another example of the system, the system may further comprise one or more quick connects configured to coupled one or more fluid-carrying components of the fuel system and/or evaporative emissions system. In such an example, the controller may store further instructions to and just prior to (e.g. within 10 seconds or less, or within 5 seconds or less) routing the positive pressure to the evaporative emissions system, command closed the canister vent valve, and command open the fuel tank isolation valve. In such an example, the diagnostic may include a test for a presence of undesired evaporative emissions or where the diagnostic includes a test for determining whether the one or more quick connects are properly latched or locked.

In another example of the system, the system may further comprise an air filter positioned in the vent line between the canister vent valve and atmosphere. In such an example, the controller may store further instructions to, just prior to (e.g. within 10 seconds or less, or within 5 seconds or less) routing the positive pressure to the evaporative emissions system, command open the canister vent valve, and command closed the fuel tank isolation valve. In such an example, the diagnostic may include a procedure to remove dust and/or debris from the air filter via the routing of the positive pressure. Turning to FIG. 4, a flow chart for a high level example method 400 for performing an evaporative emissions test diagnostic procedure on an evaporative emissions control system (e.g. 154) and fuel system (e.g. 106), is shown. More specifically, method 400 may be used to conduct an evaporative emissions test diagnostic procedure by operating or activating (e.g. turning on) an electric booster (e.g. 155) while an engine of the vehicle is not in operation (not combusting air and fuel). By activating the electric booster, pressure in an intake of the engine may become positive with respect to atmospheric pressure, which may result in a positive pressure with respect to atmospheric pressure being communicated to the fuel system and/or evaporative emissions system, under conditions when a V1 valve (e.g. 165) or V1a valve (e.g. 265) is commanded fully open and with a CPV (e.g. 158) and a CVV (e.g. 172) commanded fully closed. In this way, the evaporative emissions test procedure may be conducted under conditions where the engine is off, which may be desirable in the case of a HEV or PHEV, where such vehicles may have limited engine run time. Furthermore, by applying positive pressure to the evaporative emissions system and fuel system, noise issues may be reduced as by using positive pressure, vapor generation may be suppressed as compared to methods relying on vacuum (negative pressure) based approaches. Still further, such a procedure does not rely on a pump positioned in the evaporative emissions system, which may reduce vehicle system costs.

Method 400 will be described with reference to the systems described herein and shown in FIGS. 1-3, though it should be understood that similar methods may be applied to other systems without departing from the scope of this disclosure. Method 400 may be carried out by a controller, such as controller 166 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-3. The controller may employ fuel system and evaporative emissions system actuators, such as canister purge valve (CPV) (e.g. 158), valve V1 (e.g. 165), valve V1a (e.g. 265), canister vent valve (CVV) (e.g. 172), electric booster (e.g. 155), FTIV (e.g. 56), etc., to alter states of devices in the physical world according to the methods depicted below.

Method 400 begins at 405 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 410, method 400 may include indicating whether conditions for an engine-off boost evaporative emissions test are met. Conditions being met at 410 may include one or more of the following. Conditions being met at 410 may include an indication that the vehicle is not in motion, and that the engine is not combusting air and fuel. As an example, such a condition may include a key-off condition (also referred to herein as a vehicle-off condition), or in some examples, a start/stop condition where the engine is shut down at a vehicle-stop event. In some examples, conditions being met at 410 may include a timer expiring during a vehicle-off condition, triggering the controller to an awake mode in order to conduct the test. Conditions being met at 410 may include a request to conduct a positive pressure-based test diagnostic for a presence or absence of undesired evaporative emissions stemming from the fuel system and/or evaporative emissions system. Conditions being met at 410 may include an indication that the vehicle system is equipped with an electric booster (e.g. 155), and that the vehicle is further equipped with a conduit (e.g. 194) for selectively coupling a conduit (e.g. 152) downstream of an ejector (e.g. 140) with a vent line (e.g. 136), via a V1 valve (e.g. 165). In another example where an outlet of the ejector is welded to an air induction system (e.g. 173), conditions being met may include an indication that the vehicle system is equipped with an electric booster and that the vehicle is further equipped with a conduit (e.g. 294) for selectively coupling a conduit (e.g. 148) upstream of the ejector to the vent line (e.g. 136), via a V1a valve (e.g. 265).

If, at 410, conditions are not indicated to be met for conducting the engine-off boost evaporative emissions test, method 400 proceeds to 415. At 415, method 400 may include maintaining current vehicle operating status. For example, if the vehicle is in operation with the engine combusting air and fuel, then such operation may be maintained. As another example, if the vehicle is in operation being propelled at least in part via energy from the onboard energy storage device, such operation may be continued. Method 400 may then end.

Returning to 410, responsive to conditions being indicated to be met for conducting the engine-off boost evaporative emissions test diagnostic, method 400 proceeds to 420. At 420, method 400 may include commanding fully closed the CVV, commanding fully closed the CPV, and commanding fully or at least substantially closed the throttle. At 420, method 400 may further include commanding closed the shut-off valve (e.g. 193) downstream of the ejector system.

Proceeding to 425, method 400 may include commanding fully open the V1 valve, under conditions where the vehicle system comprises a vehicle system such as that depicted at FIG. 1. Under conditions where the vehicle system comprises a vehicle system such as that depicted at FIG. 2, the V1a valve may be commanded fully open at 425. In some examples, at 425, where the vehicle system includes a FTIV (e.g. 56), the FTIV may be commanded open in order to couple the fuel system to the evaporative emissions system. However, it may be understood that in some examples the vehicle system may not include an FTIV, or the FTIV may be commanded/maintained closed in order to only diagnose the evaporative emissions system for the presence or absence of undesired evaporative emissions. Still further, in a case where the FTIV is commanded open, pressure in the fuel system and evaporative emissions system may be allowed to reach atmospheric pressure via maintaining open the CVV, and then the CVV may be commanded closed in order to conduct the test.

Proceeding to 430, method 400 may include activating the electric booster to direct compressed air in the direction of the intake manifold. Activating the electric booster at 430 may comprise activating the electric booster at only a fraction of its maximum speed (e.g. 30% or less, 25% or less, 20% or less, etc.).

With the electric booster activated, positive pressure with respect to atmospheric pressure may be routed through the ejector, and through a conduit (e.g. 194) that includes the V1 valve, to the evaporative emissions system and fuel system, under conditions where the vehicle system comprises a vehicle system such as that depicted at FIG. 1. Alternatively, with the electric booster activated, positive pressure with respect to atmospheric pressure may be routed through a conduit (e.g. 294) prior to the ejector and to the evaporative emissions system and fuel system, where the conduit includes the V1a valve.

In either case, at 435, pressure in the fuel system and evaporative emissions system may be monitored via the fuel tank pressure transducer (e.g. 107) (under conditions where the fuel system is coupled to the evaporative emissions system).

Proceeding to 440, it may be determined as to whether the pressure has built to a pressure build threshold within a predetermined duration of time. If the predetermined duration of time (e.g. less than 1 minute) has elapsed without the pressure in the fuel system and evaporative emissions system reaching the pressure build threshold, then method 400 may proceed to 445. At 445, method 400 may include indicating degradation. In one example, degradation may be due to the V1 valve, or the V1a valve, not opening when commanded to do so. In another example, there may be a source of undesired evaporative emissions (e.g. a gross source) stemming from the fuel system and/or evaporative emissions system, such that the pressure cannot build to the pressure build threshold. In another example, the CVV may be stuck open to at least some extent.

With degradation indicated at 445, method 400 may proceed to 450. At 450, method 400 may include commanding closed either V1 or V1a (whichever was commanded open at 425), commanding fully open the CVV, and deactivating the electric booster. While not explicitly illustrated, the throttle may be returned to a position it was in prior to conducting the diagnostic, and the FTIV may be commanded closed (provided it was commanded open at 425).

Proceeding to 455, method 400 may include storing the results of the test diagnostic at the controller. At 455, method 400 may further include updating vehicle operating conditions to reflect the indication of degradation. In one example, updating vehicle operating conditions may include illuminating a malfunction indicator light (MIL) at the vehicle dash alerting the vehicle operator of a request to service the vehicle. Updating vehicle operating conditions at 455 may further include updating an evaporative emissions test diagnostic schedule, to reflect the degradation. For example, evaporative emissions test diagnostics may be postponed until the degradation has been remedied. Updating vehicle operating conditions at 455 may in some examples include updating a canister purging schedule, to reflect the degradation. For example, canister purging operations may be postponed until the degradation is remedied. In another example, the vehicle may be operated as frequently as possible in an electric-only mode of operation. Method 400 may then end.

Returning to 440, responsive to pressure in the fuel system and evaporative emissions system reaching the pressure build threshold, method 400 may proceed to 460. At 460, method 400 may include commanding fully closed the V1 valve or V1a valve, depending on which was commanded open at 425. At 460, method 400 may further include deactivating the electric booster so that the electric booster stops compressing air. Still further, at 460, the shut-off valve (e.g. 193) may be commanded open. In this way, the fuel system and evaporative emissions system may be sealed from atmosphere and from the engine system.

With the fuel system and evaporative emissions system sealed, method 400 may proceed to 465. At 465, method 400 may include measuring a pressure bleed down rate, or pressure bleed down amount. Pressure bleed down may be monitored via the fuel tank pressure transducer, for example, in a case where the fuel system is fluidically coupled to the evaporative emissions system.

Proceeding to 470, method 400 may include indicating whether the monitored/measured pressure bleed down rate or amount is greater than a pressure bleed down rate threshold, or a pressure bleed down threshold amount. If not, method 400 may proceed to 475. At 475, method 400 may include indicating an absence of undesired evaporative emissions. In other words, because the pressure in the fuel system and evaporative emissions system did not bleed down faster than the bleed down rate threshold or did not bleed down to the bleed down threshold amount, there are not sources of undesired evaporative emissions greater than a predetermined size (e.g. 0.02").

With an absence of undesired evaporative emissions indicated at 475, method 400 may proceed to 485. At 485, method 400 may include commanding open the CVV. In examples where the fuel system was fluidically coupled to the evaporative emissions system for conducting the diagnostic, the fuel system may be sealed from the evaporative emissions system at 485. With the evaporative emissions system coupled to atmosphere, pressure in the evaporative emissions system may return to atmospheric pressure.

Proceeding to 455, method 400 may include storing the results of the test diagnostic at the controller, and updating vehicle operating conditions to reflect the passing result. For example, a schedule for conducting the diagnostic for presence or absence of undesired evaporative emissions may be updated based on the absence of undesired evaporative emissions. Method 400 may then end.

Returning to 470, if the pressure bleed down rate is greater than the pressure bleed down rate threshold, or if pressure bleed down is greater than the pressure bleed down threshold amount, method 400 may proceed to 480. At 480, method 400 may include indicating a presence of undesired evaporative emissions stemming from the fuel system and/or evaporative emissions system. With such a result indicated, method 400 may proceed to 485. At 485, method 400 may include commanding open the CVV, and in some examples, commanding closed the FTIV. Proceeding to 455, method 400 may include storing the results at the controller, and updating vehicle operating conditions. Updating vehicle operating conditions at 455 in response to the indication of the presence of undesired evaporative emissions may include illuminating a MIL at the vehicle dash, alerting the vehicle operator of a request to service the vehicle. Updating vehicle operating conditions at 455 may in some examples include updating a canister purge schedule, and updating an undesired evaporative emissions test diagnostic schedule, to reflect the indicated presence of undesired evaporative emissions. For example, canister purging may be postponed until the source of the undesired evaporative emissions is remedied, and tests for undesired evaporative emissions may be postponed until the source is remedied. In other examples, updating vehicle operating parameters may additionally or alternatively include operating the vehicle as frequently as possible in an electric-only mode of operation. Method 400 may then end.

It is further recognized that the diagnostic for the presence or absence of undesired evaporative emissions depicted at FIG. 4, may enable a determination as to whether the air filter (e.g. 123) is clogged or restricted. For example, if, while conducting the diagnostic of FIG. 4, it is indicated that there is an absence of undesired evaporative emissions then the electric booster may be deactivated, the V1 or V1a valve may be commanded closed, and the CVV may be commanded open. Pressure in the evaporative emissions system may be monitored, and if the positive pressure remains greater (more positive) than a positive pressure threshold for a predetermined amount of time, then it may be indicated that the air filter may be clogged to a level beyond an air filter loading threshold. In such an example, the indication may be stored at the controller such that an air filter cleaning diagnostic may be conducted, as will be discussed in further detail below. While the example provided above relates to situations where an absence of undesired evaporative emissions is indicated, it is additionally recognized that such a diagnostic for indicating whether the air filter is clogged could similarly be conducted in a case where the presence of undesired evaporative emissions is indicated, and where, upon deactivating the electric booster, commanding closed the V1 valve or V1a valve, and commanding open the CVV, pressure in the evaporative emissions system remains greater than the positive pressure threshold for the predetermined amount of time. In some examples, such an indication may be alternatively provided based on a rate of pressure decrease being less than a predetermined rate of pressure decrease.

It is still further herein recognized that the diagnostic for the presence or absence of undesired evaporative emissions as discussed above with regard to FIG. 4 may be conducted in such a fashion as to indicate whether the source of undesired evaporative emissions is stemming from the fuel system or the evaporative emissions system, or both. In such an example, the vehicle system may include a FTIV, and the positive pressure may be directed to the fuel system and evaporative emissions system simultaneously with the FTIV open. Responsive to the positive pressure building to the threshold (see step 440), the FTIV may be commanded closed, the V1 or V1a valve may be commanded closed, and the electric booster may be deactivated. Pressure bleed down may thus be independently monitored in the fuel system and the evaporative emissions system, via the fuel tank pressure transducer (e.g. 107) and the pressure sensor (e.g. 109) positioned in the evaporative emissions system. In this way, it may be ascertained as to whether the source of undesired evaporative emissions stems from the fuel system, the evaporative emissions system, both the fuel system and the evaporative emissions system, provided a source of undesired evaporative emissions is indicated.

Turning now to FIG. 5, a flow chart for a high level example method 500 for performing a diagnostic to determine whether or not one or more quick connectors (e.g. 163) (referred to herein as quick connects) are improperly latched or locked, is shown. More specifically, method 500 relates to a diagnostic that uses positive pressure provided via an electric booster positioned in an intake of an engine to pressurize a fuel system and evaporative emissions system of a vehicle, to determine whether the one or more quick connects are not properly locked. Quick connects or snap fit connectors may be used to couple various fluid-carrying conduits and components (such as valves) of the fuel system and/or evaporative emissions system. The connectors may be shaped and structured to be closed in a single uniaxial movement which facilitates automated assembly as well as part servicing.

If negative pressure is used to diagnose whether the quick connects are properly locked, the negative pressure may cause the quick connects to seal momentarily and may result in a passing result, even though one or more quick connects are not properly locked. In such an example, when the vehicle is subsequently driven, vibrations and surface feedback may cause the connector to pop open. Such issues may lead to the release of undesired evaporative emissions to environment, and may wrongly indicate that the evaporative emissions system is free from sources of undesired evaporative emissions when in fact, one or more quick connects are not properly locked. Thus, such issues may be remedied via the use of positive pressure to indicate whether the one or more quick connects are properly latched, and furthermore, via the use of the electric booster, such a diagnostic may be conducted without introducing a costly pump into the evaporative emissions system.

Method 500 will be described with reference to the systems described herein and shown in FIGS. 1-3, though it should be understood that similar methods may be applied to other systems without departing from the scope of this disclosure. Method 500 may be carried out by a controller, such as controller 166 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-3. The controller may employ fuel system and evaporative emissions system actuators, such as canister purge valve (CPV) (e.g. 158), valve V1 (e.g. 165), valve V1a (e.g. 265), canister vent valve (CVV) (e.g. 172), electric booster (e.g. 155), etc., to alter states of devices in the physical world according to the methods depicted below.

Method 500 begins at 505 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 510, method 500 may include indicating whether conditions are met for conducting a positive pressure-based diagnostic for whether or not one or more quick connects configured within a vehicle evaporative emissions system and/or fuel system are properly latched/locked. Conditions being met may include one or more of the following examples. Conditions being met at 510 may include, for example, an indication that the vehicle system is at an end-of-line (EOL) station in an assembly plant where such a diagnostic is requested either via the controller or via a technician. Conditions being met at 510 may include, in another example, an indication that the vehicle has recently been serviced (indicated for example via an oil life reset to 100%, after an indication of battery power loss as technicians frequently disconnect batteries during a repair process, or after fuel systems/evaporative emissions system diagnostic trouble codes (DTCs) have been cleared from controller memory), and that the controller is requesting a diagnostic as to whether or not the one or more quick connects are properly latched/locked. Conditions being met at 510 may in some examples include an indication that the engine is not combusting air and fuel. Conditions being met at 510 may include an indication that a timer has elapsed during a vehicle-off event, such that the controller is awoken in order to conduct the test diagnostic. In some examples, conditions being met at 510 may include an indication that the vehicle is stopped, for example at a start/stop event. In another example, conditions being met at 510 may include a key-off event where the controller is kept alive (kept awake) in order to conduct the diagnostic. In still other examples, conditions being met at 510 may include an indication that the vehicle system comprises a vehicle system such as that depicted at FIG. 1 or FIG. 2.

If, at 510, conditions are not indicated to be met for conducting the quick connects diagnostic, method 500 may proceed to 515. At 515, method 500 may include maintaining current vehicle operating parameters. For example, if the vehicle is off, then the vehicle may be maintained off without conducting the diagnostic. If the vehicle is in operation, either being propelled via the engine combusting air and fuel, or at least in part via power supplied from the onboard energy storage device, such operation may be maintained. Method 500 may then end.

Returning to 510, if conditions are indicated to be met for conducting the quick connects diagnostic, method 500 may proceed to 520. At 520, method 500 may include commanding closed the CVV, commanding or maintaining closed the CPV, and commanding closed (or at least substantially closed) the throttle. In some examples, the shut-off valve (e.g. 193) may additionally be commanded closed. In examples where the vehicle system includes an FTIV, the FTIV may be commanded open at step 520 to fluidically couple the fuel system to the evaporative emissions system, when requested via the controller. In situations where the FTIV is commanded open to fluidically couple the fuel system to the evaporative emissions system, the CVV may be maintained open after commanding open the FTIV, to allow pressure in the fuel system and evaporative emissions system to return to atmospheric pressure, and then the CVV may be commanded closed.

Proceeding to 525, method 500 may include commanding fully open the V1 valve (e.g. 165) if the vehicle system includes the vehicle system depicted at FIG. 1, or may include commanding fully open the V1a valve (e.g. 265) if the vehicle system includes the vehicle system depicted at FIG. 2.

Proceeding to 530, method 500 may include activating the electric booster (e.g. 155). The electric booster may be activated at 100% of its maximum speed, or within a threshold (e.g. within greater than 85% or within greater than 90%) of its maximum speed. Compared to the evaporative emissions test diagnostic discussed above at FIG. 4, where the electric booster was activated at a lower speed, activating the electric booster at the higher speed for method 500 may serve to force open any quick connects that are not properly latched or locked.

With the electric booster activated at 530, method 500 may proceed to 535. At 535, method 500 may include monitoring the pressure build in the evaporative emissions system and fuel system. It may be understood that in this description of method 500, the fuel system and evaporative emissions systems are fluidically coupled to one another via the open FTIV. However, it may be understood that in some examples the FTIV may be commanded closed such that the diagnostic is only conducted on the evaporative emissions system. As discussed above, monitoring pressure in the fuel system and evaporative emissions system may be done via a fuel tank pressure transducer (e.g. 107). In a case where the fuel system is maintained sealed from the evaporative emissions system, an evaporative emissions system pressure sensor (e.g. 109) may be utilized for monitoring pressure in the evaporative emissions system.

Proceeding to 540, method 500 may include indicating whether there is a sudden indication of a rapid loss of pressure in the fuel system and evaporative emissions system. In other words, if the positive pressure applied on the fuel system and evaporative emissions system has forced open one or more of the quick connects, then one or more improperly latched or locked quick connects may be the culprit. Such an indication may not be made if negative pressure were applied on the fuel system and evaporative emissions system, as negative pressure may cause improperly latched quick connects to seal momentarily. If, at 540, a sudden loss of pressure in the fuel system and evaporative emissions system is not indicated over the course of a predetermined duration (e.g. 10 seconds or less, 20 seconds or less, 30 seconds or less, 1 minute or less, etc.), then method 500 may proceed to 545. At 545, method 500 may include indicating that the one or more quick connects are all properly latched or locked. Proceeding to 550, method 500 may include commanding fully closed either valve V1 (e.g. 165) or V1a (e.g. 265), depending on what valve was commanded fully open at step 525. Furthermore, at 550, the CVV may be commanded fully open, and in the case where the FTIV was commanded open for conducting the diagnostic, the FTIV may be commanded closed. Still further, the throttle may be returned to the position it was in prior to conducting the diagnostic, and the shut-off valve may be commanded open or returned to its original position.

Proceeding to 555, method 500 may include deactivating (e.g. turning off) the electric booster. At 560, method 500 may include storing the passing result at the controller, and updating vehicle operating conditions to reflect the passing result. For example, a canister purge schedule may be updated to reflect the absence of any issues associated with the quick connects, and a schedule for conducting tests for undesired evaporative emissions stemming from the evaporative emissions system and/or fuel system may be updated based on the result. Method 500 may then end.

Returning to 540, if a sudden loss of pressure is indicated within the predetermined duration, then method 500 may proceed to 565. More specifically, a sudden loss of pressure greater than a pressure loss threshold, may result in method 500 proceeding to 565. At 565, method 500 may include indicating that one or more of the quick connects are not properly latched or locked. In other words, because the positive pressure applied on the evaporative emissions system and fuel system was able to force open one or more of the quick connects which resulted in a rapid loss of pressure during the diagnostic, one or more of the quick connects is not properly latched or locked. Accordingly, proceeding to 550, method 500 may include commanding open the CVV, and commanding closed either valve V1 or valve V1a, depending on which valve was commanded open at step 525. Furthermore, at 550, if the FTIV was commanded open for conducting the diagnostic, the FTIV may be commanded closed.

Proceeding to 555, method 500 may include deactivating the electric booster. At 560, method 500 may include storing the result at the controller, and may further include updating vehicle operating conditions. Updating vehicle operating conditions may include illuminating a MIL at the vehicle dash, alerting the vehicle operator of a request to service the vehicle. Updating vehicle operating conditions at 560 may additionally or alternatively include updating a canister purge schedule to reflect the indication of one or more quick connects that are not properly latched or locked. For example, purging may be postponed until the issue with the one or more quick connects are indicated to have been remedied. In another example, a schedule for conducting a test for the presence or absence of undesired evaporative emissions may be updated based on the indication of the one or more quick connects not being properly latched or locked. For example, such diagnostics may only be conducted via negative pressure until the issue with the quick connects has been remedied. Alternatively, evaporative emissions system and fuel system diagnostics may be postponed until the issue with the quick connects has been remedied. Method 500 may then end.

It is herein recognized that for vehicle systems that include an FTIV, there may be opportunity during a positive pressure-based diagnostic for making a determination as to whether one or more quick connects that are not properly latched are likely to positioned in the fuel system, as compared to the evaporative emissions system, or vice versa. In such an example, method 500 may be used such that the fuel system and evaporative emissions system may be fluidically coupled via commanding open the FTIV and otherwise sealed as discussed, and the electric booster may provide compressed air (e.g. positive pressure with respect to atmospheric pressure) to the evaporative emissions system and fuel system via an open V1 valve or V1a valve. In response to an indication of a rapid decrease in pressure with the electric booster activated, the FTIV may be commanded closed to seal the fuel system from the evaporative emissions system. Pressure in the fuel system may thus be monitored independently from the pressure in the evaporative emissions system, via a fuel tank pressure transducer (e.g. 107), and a pressure sensor positioned in the evaporative emissions system (e.g. 109), respectively. The electric booster may be maintained activated with the FTIV commanded closed. If pressure in the fuel system continues to decay to atmospheric pressure, then it may be indicated that at least one or more quick connects in the fuel system are not properly latched or locked. If pressure in the evaporative emissions system continues to decay to atmospheric pressure, then it may be additionally indicated that at least one or more quick connects in the evaporative emissions system are not properly latched or locked. Alternatively, if pressure in the fuel system stops decaying to atmospheric pressure when the FTIV is commanded closed, then it may be indicated that the one or more quick connects in the fuel system are properly latched or locked, and that the source of the one or more quick connects that are not properly latched or locked may be the evaporative emissions system. In still another example, if pressure in the evaporative emissions system stops decaying to atmospheric pressure (and continues to build) while pressure in the fuel system continues to decay to atmospheric pressure, then the source of the one or more quick connects that are not properly latched or locked may be in the fuel system and not the evaporative emissions system.

It is herein additionally recognized that for vehicles with an FTIV, there may be another different example methodology for determining whether one or more quick connects that are not properly latched or locked are positioned in the fuel system and/or the evaporative emissions system. In such an example, the FTIV may be commanded closed prior to routing positive pressure to the evaporative emissions system that is otherwise sealed as discussed, via activation of the electric booster and opening of the V1 or V1a valve. In such an example, if while the electric booster is routing positive pressure to the evaporative emissions system, a sudden loss of pressure is not indicated over the course of the predetermined duration (e.g. 10 seconds or less, 20 seconds or less, 30 seconds or less, 1 minute or less, etc.), then the FTIV may be commanded open, and again it may be determined as to whether there is a sudden loss of pressure indicated over the course of the predetermined duration. If a sudden loss of pressure is indicated, then the source of the one or more quick connects that are not properly latched or locked may be pinpointed as being positioned in the fuel system and not the evaporative emissions system.

It is further recognized that the diagnostic for the quick connects depicted at FIG. 5, may enable a determination as to whether the air filter (e.g. 123) is clogged or restricted. For example, if, while conducting the diagnostic of FIG. 5 (or variation thereof as discussed), it is indicated that the one or more quick connects are properly latched, in other words, a sudden loss of pressure in the fuel system and/or evaporative emissions system is not indicated over the predetermined duration, then the electric booster may be deactivated, the V1 or V1a valve may be commanded closed, and the CVV may be commanded open. Pressure in the evaporative emissions system may be monitored, and if the positive pressure remains greater (more positive) than a positive pressure threshold for a predetermined amount of time, then it may be indicated that the air filter may be clogged to a level beyond an air filter loading threshold. In such an example, the indication may be stored at the controller such that an air filter cleaning diagnostic may be conducted, as will be discussed in further detail below.

Turning now to FIG. 6, a flow chart for a high level example method 600 for performing a diagnostic to reduce an amount of dust and debris on an air filter in a vent line of an evaporative emissions system, is shown. More specifically, the method may include an indication that the air filter is clogged to an extent greater than an air filter loading threshold. Responsive to such an indication, a positive pressure may be directed at the air filter via activating an electric booster positioned in an intake of an engine of the vehicle for which the air filter is associated. To route compressed air from the intake to the air filter, a V1 (e.g. 165) or V1a (e.g. 265) valve may be commanded open, as discussed above and which will be further discussed below. In this way, onboard cleaning of the air filter may be conducted without introduction of a pump into the evaporative emissions system, which may reduce costs and which may improve canister purging operations and thus reduce undesired evaporative emissions.

Method 600 will be described with reference to the systems described herein and shown in FIGS. 1-3, though it should be understood that similar methods may be applied to other systems without departing from the scope of this disclosure. Method 600 may be carried out by a controller, such as controller 166 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-3. The controller may employ fuel system and evaporative emissions system actuators, such as canister purge valve (CPV) (e.g. 158), valve V1 (e.g. 165), valve V1a (e.g. 265), canister vent valve (CVV) (e.g. 172), electric booster (e.g. 155), etc., to alter states of devices in the physical world according to the methods depicted below.

Method 600 begins at 605 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 may include indicating whether conditions are met for conducting an air filter (e.g. 123) cleaning diagnostic. Conditions being met at 610 may include one or more of the following. Conditions being met may include an indication that the air filter is clogged to a level beyond the air filter loading threshold. For example, in a condition where there is either a positive or negative pressure in the evaporative emissions system with the CVV closed and the evaporative emissions system and fuel system is otherwise sealed from atmosphere, in response to commanding open the CVV, if the positive pressure or negative pressure remains greater (either more positive or more negative, respectively) than a positive pressure threshold or a negative pressure threshold, respectively, for a predetermined amount of time, then the air filter may be indicated to be clogged to the level beyond the air filter loading threshold. In other words, if standing pressure in the evaporative emissions system does not return to atmospheric pressure as expected when the CVV is commanded open to relieve said pressure, it may be indicated that the air filter is clogged to a level beyond the air filter loading threshold.

Conditions being met at 610 may include one or more of the following. Conditions being met at 610 may include an indication that the engine is not combusting air and fuel. Conditions being met at 610 may include an indication that the vehicle system includes an electric booster, and a V1 valve (e.g. 165) or a V1a valve (e.g. 265). Conditions being met at 610 may include an indication that there is not a presence of undesired evaporative emissions in the evaporative emissions system, and that one or more quick connects (e.g. 163) are properly latched or locked. Conditions being met at 610 may in some examples include an indication that a predetermined amount of time has elapsed since a prior air filter cleaning diagnostic was conducted. In other words, such a diagnostic may be periodically conducted.

If, at 610, conditions are not indicated to be met for conducting the air filter cleaning, method 600 may proceed to 615. At 615, method 600 may include maintaining current vehicle operating status. For example, if the engine is combusting air and fuel, such vehicle operation may be maintained. If the vehicle is in operation being propelled at least in part via energy provided via the onboard energy storage device, then such operating conditions may be maintained. Method 600 may then end.

Returning to 610, responsive to conditions being met for conducting the air filter cleaning diagnostic, method 600 may proceed to 620. At 620, method 600 may include commanding closed the FTIV to isolate the fuel system from the evaporative emissions system. Proceeding to 625, method 600 may include commanding or maintaining open the CVV, and commanding or maintaining closed the CPV. While not explicitly illustrated, at 625 method 600 may include commanding fully closed the throttle, or substantially closing the throttle. The shut-off valve (e.g. 193) may be commanded closed. Continuing at 630, method 600 may include commanding open the V1 valve or the V1a valve, depending on whether the vehicle system comprises the vehicle system depicted at FIG. 1 or FIG. 2, respectively. Furthermore, at 630, method 600 may include activating the electric booster at 100% of its maximum speed, or within a threshold (e.g. within greater than 85% or within greater than 90%) of its maximum speed. Compared to the evaporative emissions test diagnostic discussed above at FIG. 4, where the electric booster was activated at a lower speed, activating the electric booster at the higher speed for method 600 may serve to dislodge any debris or dust that has accumulated on the air filter (e.g. 123), and push said debris or dust to atmosphere, thus cleaning the air filter.

Proceeding to 635, method 600 may include monitoring pressure in the evaporative emissions system. Monitoring pressure at 635 may be conducted via a pressure sensor (e.g. 109) positioned in the vent line.

Continuing at 640, method 600 may include indicating whether pressure in the evaporative emissions system builds as a result of the electric booster forcing positive pressure with respect to atmosphere to the evaporative emissions system, and then steadily decreases as the dust and debris is removed from the air filter. If, at 640, pressure is indicated to be steadily decreasing, method 600 may proceed to 645. At 645, method 600 may include indicating that the air filter is being cleaned from dust and debris. Accordingly, method 600 may proceed to 650, and may include continuing to operate the electric booster until a pressure in the evaporative emissions system becomes within a predetermined threshold of atmospheric pressure. For example, the predetermined threshold of atmospheric pressure may include pressure in the evaporative emissions system being within 20% or less of atmospheric pressure, within 10% or less of atmospheric pressure, within 5% or less of atmospheric pressure, etc.

Responsive to the pressure in the evaporative emissions system being within the predetermined threshold of atmospheric pressure, method 600 may proceed to 655, and may include commanding closed the V1 valve or V1a valve, depending on which valve was commanded open at 630. While not explicitly illustrated, it may be understood that the shut-off valve (e.g. 193) may be commanded open, and the throttle may be returned to the position it was in prior to conducting the diagnostic. With the V1 valve or V1a valve commanded closed, method 600 may proceed to 660, where the electric booster may be deactivated (e.g. turned off). Continuing at 665, method 600 may include storing the result at the controller, and updating vehicle operating conditions based on the indication that the air filter has been effectively cleaned. Updating vehicle operating conditions may include updating conditions for canister purging. For example, a flow map at the controller that is utilized for controlling a duty cycle of the CPV based on a requested flow and a level of intake manifold vacuum for purging of the fuel vapor storage canister, may be updated to reflect the fact that the air filter has been cleaned. In other words, because the air filter is much less restricted as a result of the air filter cleaning diagnostic, the duty cycle for achieving a particular requested flow at a particular intake manifold vacuum, may be adjusted such that the requested flow is accurately achieved. Method 600 may then end.

Returning to 640, responsive to pressure in the evaporative emissions system not steadily decreasing (e.g. remaining at a particular pressure or increasing), after a predetermined duration of time (e.g. less than 10 seconds, less than 20 seconds, etc.), method 600 may proceed to 670, where a restriction may be indicated in the evaporative emissions system. In one example, such a restriction may comprise the air filter being clogged to an extent where directing compressed air at the air filter is not sufficient to remove the source of the clogging. In another example, the CVV may be stuck in a closed or substantially closed (e.g. within 10% or less of fully closed, etc.) configuration.

Responsive to the indication of the restriction, method 600 may proceed to 655, where the V1 valve or the V1*a* valve may be commanded closed, depending on which valve was commanded open at 630 of method 600. Continuing to 660, method 600 may include deactivating the electric booster (e.g. turning off the electric booster). Proceeding to 665, method 600 may include storing the results of the diagnostic at the controller. Furthermore, at 665, vehicle operating conditions may be updated to reflect the indicated restriction in the evaporative emissions system. Specifically, a MIL may be illuminated at the vehicle dash, alerting a vehicle operator of a request to service the vehicle. In some examples, canister purging operations may be postponed until it is indicated that the source of the restriction has been mitigated. Furthermore, diagnostics as to the presence or absence of undesired evaporative emissions stemming from the evaporative emissions system and/or fuel system may be postponed until it is indicated that the source of the restriction has been mitigated. In some examples, due to the indicated restriction, the vehicle may be controlled via the controller to operate as frequently as possible in electric-only modes of operation. Method 600 may then end.

Thus, the methods described above may enable a method for a vehicle comprising receiving purge gasses from an evaporative emissions system selectively fluidically coupled to a fuel system, under boosted engine operation and natural aspiration engine operation; activating an electric compressor positioned in an engine intake to direct a positive pressure with respect to atmospheric pressure to the fuel system and/or evaporative emissions system; and conducting a diagnostic based on the positive pressure. In such a method, the compressor may be activated under conditions where the engine is not combusting air and fuel. Activating the electric compressor may include providing power for the electric compressor via an onboard energy storage device, or under conditions where the vehicle receives energy from a source external to the vehicle.

In one example, directing the positive pressure to the fuel system and/or evaporative emissions system may include directing the positive pressure through an ejector positioned in an ejector system, and then directing the positive pressure to the fuel system and/or evaporative emissions system. In another example, directing the positive pressure to the fuel system and/or evaporative emissions system may be conducted without first directing the positive pressure through the ejector positioned in the ejector system. In either case, such a method may further comprise commanding closed an air intake throttle positioned in the engine intake, commanding closed a shut-off valve positioned in a conduit downstream of the ejector, and commanding closed a canister purge valve positioned in a purge line coupled to the ejector, for directing the positive pressure to the fuel system and/or evaporative emissions system.

In such a method, the diagnostic relying on the positive pressure may include a test for a presence or absence of undesired evaporative emissions stemming from the fuel system and/or evaporative emissions system.

In another example of the method, the diagnostic relying on the positive pressure may include a test to determine whether one or more quick connects that are utilized to couple one or more fluid-carrying components of the fuel system and/or evaporative emissions system are latched or locked, by monitoring for a sudden decrease in pressure in the fuel system and/or evaporative emissions system while the positive pressure is being directed to the fuel system and/or evaporative emissions system.

In another example of the method, the diagnostic relying on the positive pressure may include an air filter cleaning diagnostic, where the air filter is positioned in a vent line of the evaporative emissions system, and where the positive pressure reduces an amount of dust and/or debris associated with the air filter.

In yet another example of the method, an electric compressor speed is variable for directing the positive pressure to the fuel system and/or evaporative emissions system as a function of the diagnostic relying on the positive pressure.

Turning now to FIG. 7, an example timeline 700 for conducting a test for a presence or absence of undesired evaporative emissions in a fuel system and/or evaporative emissions system of a vehicle that includes a dual-path purge system (e.g. 171), is shown. Timeline 700 includes plot 705, indicating whether a key-on event is indicated (yes or no), plot 710, indicating a status of an electric booster (e.g. 155) (off, or on at ~25% maximum speed), over time. Timeline 700 further includes plot 715, indicating a CPV (e.g. 158) status, a V1 valve (e.g. 165) status, and a CVV (e.g. 172) status, over time. The CPV, V1 valve, and CVV may either be fully open or fully closed. Timeline 700 further includes plot 730, indicating a status of a fuel tank pressure transducer (FTPT) (e.g. 107), over time. The fuel tank pressure transducer in this example may be at atmospheric pressure, or may be positive (+) with respect to atmospheric pressure, over time. Timeline 700 further includes plot 733, indicating whether a shut-off valve (e.g. 193) is open or closed, over time. Timeline 700 further includes plot 735, indicating whether a presence of undesired evaporative emissions is indicated (yes) or not (no), and plot 740, indicating whether conditions are met for conducting the diagnostic for presence or absence of undesired evaporative emissions (yes or no), over time.

At time t0, a key-on event is not indicated. In other words, in this example timeline, the vehicle is off, and while not explicitly illustrated, it may be understood the engine is not combusting air and fuel. The electric booster is off (plot 710), the CPV is closed (plot 715), the V1 valve is closed (plot 720), the CVV is open (plot 725), and pressure in the fuel system and evaporative emissions system is near atmospheric pressure (plot 730). In this example timeline, it may be understood that the vehicle system does not include an FTIV, but as discussed in other examples the FTIV may be included, and may enable pinpointing the source of undesired evaporative emissions to the fuel system or evaporative emissions system. As in this example timeline the FTIV is not included, when the CVV is open, the fuel system and evaporative emissions system is coupled to atmosphere, hence the fuel system pressure is registering atmospheric pressure at time t0. Furthermore, undesired evaporative emissions are not indicated (plot 735), and conditions are not yet met for conducting the diagnostic as to the presence or absence of undesired evaporative emissions (plot 740).

At time t1, conditions are indicated to be met for conducting the evaporative emissions test diagnostic procedure. Specifically, it may be understood that the evaporative emissions test diagnostic is scheduled for a particular time during the vehicle-off condition, and the controller is awoken at time t1 in order to conduct the test. Accordingly, at time t2, the CPV is maintained closed, the V1 valve is commanded fully open, the CVV is commanded fully closed, and the electric booster is activated to 25% of its maximum speed. While not explicitly illustrated, it may be further understood that at time t2, the throttle (e.g. 114) may be commanded to a fully closed or substantially closed (within 10% or less of fully closed) position. Furthermore, the shut-off valve (e.g. 193) is commanded closed. In this way, positive pressure generated via the electric booster is routed to the evaporative emissions system and fuel system.

Accordingly, between time t2 and t3, pressure in the fuel system and evaporative emissions system increases, and reaches the pressure build threshold (see step 440 of method 400), represented via line 731. Accordingly, the electric booster is deactivated, and the V1 valve is commanded closed at time t3. In other words, the fuel system and evaporative emissions system is sealed from atmosphere and from engine intake. The shut-off valve is commanded open at time t3. Between time t3 and t4, pressure bleed down in the fuel system and evaporative emissions system is monitored. It may be understood that pressure bleed down is monitored for a predetermined duration, the predetermined duration comprising the duration between time t3 and t4. Line 732 represents a pressure bleed down threshold amount, and because the pressure bleed down does not reach the pressure bleed down threshold amount during the time frame encompassing time t3 to time t4, undesired evaporative emissions are not indicated (plot 735). With the results of the diagnostic obtained, conditions are no longer indicated to be met for conducting the diagnostic (plot 740), and accordingly, the CVV is commanded open (plot 725). With the CVV commanded open, pressure in the fuel system and evaporative emissions system rapidly returns to atmospheric pressure (plot 730). While in this example timeline, upon opening the CVV, pressure in the fuel system and evaporative emissions system rapidly returns to atmospheric pressure, in some examples, pressure may not rapidly decay to atmospheric pressure, as discussed above. In such an example, if the positive pressure remains above a positive pressure threshold over the course of the predetermined amount of time (see step 610), then it may be indicated that the air filter (e.g. 123) is clogged and a diagnostic for cleaning the air filter may be scheduled to be conducted upon conditions being met for doing so. In some examples, if conditions are met for doing so, the pressure remaining in the evaporative emissions system may be used to conduct the air filter cleaning diagnostic. For example, because there is already pressure in the evaporative emissions system, rather than let said pressure slowly dissipate to atmosphere, the V1 valve may be commanded fully open with the CPV maintained closed, the FTIV commanded closed, and the throttle commanded or maintained closed (or substantially closed), and the electric booster may be activated at 100% as discussed above in order to clean the air filter according to the method of FIG. 6. By utilizing pressure already in the evaporative emissions system, the electric booster may need to be activated for a shorter period of time than if the evaporative emissions system were at atmospheric pressure, which may conserve onboard energy storage and thus increase fuel economy. Such reduction in use of onboard energy storage may be particularly relevant for hybrid electric vehicles.

While the above example timeline included the V1 valve, it may be understood that under conditions where the vehicle system includes the V1a valve rather than the V1 valve, the V1a valve may be used in similar fashion as that described above, without departing from the scope of the present disclosure.

Turning now to FIG. 8, an example timeline 800 for indicating whether one or more quick connects (e.g. 163) positioned in a vehicle evaporative emissions system and/or fuel system, are not properly latched or locked, where the vehicle includes a dual-path purge system such as that depicted at FIGS. 1-2. Timeline 800 includes plot 805, indicating whether a key-on event is indicated (yes or no), and plot 810, indicating a status of an electric booster (e.g. 155), over time. The electric booster in this example timeline may be off, or may be operating at or near its maximum (100%) speed. Timeline 800 further includes plot 815, indicating a status of the CPV (e.g. 158), plot 820, indicating a status of the V1 valve (e.g. 165), and plot 825, indicating a status of the CVV (e.g. 172), over time. Each of the CPV, the V1 valve and the CVV may be either fully open or fully closed, over time. Timeline 800 further includes plot 830, indicating pressure in the fuel system and evaporative emissions system, over time. In this example, it may be understood that the FTIV is not included in the vehicle system, thus the pressure in the fuel system and evaporative emissions system is indicated via the FTPT (e.g. 107). Pressure in the fuel system and evaporative emissions system in this example may be either at atmospheric pressure, or positive (+) with respect to atmospheric pressure. Timeline 800 further includes plot 833, indicating whether the shut-off valve (e.g. 193) is open or closed, over time. Timeline 800 further includes plot 835, indicating whether one or more quick connects are not properly latched, and plot 840, indicating whether conditions are met for conducting the quick connects diagnostic, over time.

At time t0, a key-on event is not indicated (plot 805). In other words, the vehicle is off, and the engine is not combusting air and fuel. The electric booster is off (plot 810), the CPV is closed (plot 815), the V1 valve is closed (plot 820), the CVV is open (plot 825) and accordingly, pressure in the fuel system and evaporative emissions system is near atmospheric pressure (plot 830). Furthermore, there is no indication that the one or more quick connects are not properly latched or locked (plot 835), and conditions are not yet indicated to be met for conducting the quick connects diagnostic (plot 840).

At time t1, conditions are indicated to be met for conducting the diagnostic. More specifically, it may be understood that the vehicle has recently been serviced (e.g. diagnostic trouble codes for fuel system and/or evaporative emissions system reset, oil life indicator reset to 100%, etc.), and accordingly the controller has scheduled the diagnostic during the particular vehicle-off event depicted at timeline 800. Thus, it may be understood that at time t1, the controller is woken from sleep mode in order to conduct the diagnostic.

At time t2, the V1 valve is commanded fully open, the CVV is commanded fully closed, and the CPV is maintained fully closed. Furthermore, while not explicitly illustrated, it may be understood that the throttle (e.g. 114) may be commanded fully closed, or at least substantially closed (e.g. within 10% or less of fully closed), at time t2. The shut-off valve is commanded closed at time t2. The electric booster is additionally commanded on at 100% maximum speed. Between time t2 and t3, pressure in the fuel system and evaporative emissions system builds, due to the electric booster routing positive pressure via the open V1 valve to the evaporative emissions system and fuel system. However, at time t3, there is a sudden drop in pressure in the fuel system and evaporative emissions system, even though the electric booster is still activated with the CVV closed and the V1 valve open.

By time t4, pressure decreases to a particular fraction (e.g. ⅓) of the pressure build the fuel system and evaporative emissions system experienced prior to the sudden loss of pressure. Accordingly, it is indicated that one or more quick connect(s) are not properly latched or locked (plot 835). With the indication that one or more quick connects are not properly latched or locked, conditions are no longer indicated to be met for conducting the diagnostic (plot 840). Accordingly, the electric booster is commanded off (plot 810), the V1 valve is commanded closed (plot 820), and the CVV is commanded fully open (plot 830). The shut-off valve is commanded closed at time t4. While not explicitly illustrated, it may be understood that the throttle may be commanded to be returned to the position it was in prior to conducting the diagnostic. Between time t4 and t5, the vehicle remains in the key-off state, and pressure in the fuel system and evaporative emissions system remains near atmospheric pressure.

While not explicitly illustrated, it may be understood that, as discussed above with regard to FIG. 5, for vehicles equipped with an FTIV, there may be opportunity to conduct the diagnostic illustrated in example timeline 800 in such a way that it may be indicated as to whether the one or more quick connects that are not properly latched or locked are positioned in the fuel system, the evaporative emissions system, or both.

Furthermore, while valve V1 is depicted as being utilized for example timeline 800, valve V1a may in other examples be utilized in similar fashion without departing from the scope of this disclosure.

Turning now to FIG. 9, an example timeline 900 for reducing an amount of dust and/or debris from an air filter (e.g. 123) positioned in a vent line (e.g. 136) of an evaporative emissions system of a vehicle that includes a dual-path purge system (e.g. 171), is shown. Timeline 900 includes plot 905, indicating whether a key-on event is indicated (yes or no), and plot 910, indicating a status of an electric booster (e.g. 155), over time. In this example timeline, the electric booster may either be off, or may be activated to its maximum (100%) speed. Timeline 900 further includes plot 915, indicating a status of the CPV (e.g. 158), plot 920, indicating a status of the V1 valve (e.g. 165), plot 925, indicating a status of the CVV (e.g. 172), and plot 930, indicating a status of the FTIV (e.g. 57), over time. The CPV, CVV, V1 valve, and FTIV may all be either fully open or fully closed. Timeline 900 further includes timeline 933 indicating whether the shut-off valve (e.g. 193) is open or closed, over time. Timeline 900 further includes plot 935, indicating pressure in the fuel system and evaporative emissions system, as monitored via a pressure sensor (e.g. 109) positioned in the vent line of the evaporative emissions system, over time. Timeline 900 further includes plot 940, indicating whether conditions are met for conducting the diagnostic to reduce dust and/or debris from the air filter, over time.

At time t0, the vehicle is off (plot 905). While not explicitly illustrated, it may be understood that a key-off event has occurred, and the vehicle controller has been kept awake in order to conduct the diagnostic. The electric booster (e.g. electric compressor) is off (plot 910), the CPV is closed (plot 915), the V1 valve is closed (plot 920), the CVV is commanded open (plot 925), and the FTIV is open (plot 930). In other words, at time t0, the FTIV has been commanded open to introduce pressure from the fuel system (positive pressure with respect to atmospheric pressure) to the evaporative emissions system, and the CVV has been commanded open in order to monitor the decay rate of the pressure in the evaporative emissions system. Accordingly, pressure in the evaporative emissions system is positive with respect to atmospheric pressure (plot 935). As of time t0, conditions are not yet indicated to be met for conducting the diagnostic for cleaning the air filter (plot 940).

Between time t0 and t1, pressure in the evaporative emissions system is monitored, and remains above a positive pressure threshold, represented by dashed line 936. It may be understood that in some examples, a pressure bleed down rate may be compared with a pressure bleed down rate threshold. Because in this example timeline pressure remained above the positive pressure threshold even though the CVV is commanded open, an air filter cleaning diagnostic is requested, and at time t1 conditions are indicated to be met for conducting the air filter cleaning diagnostic.

Accordingly, at time t2, the V1 valve is commanded fully open, the FTIV is commanded fully closed, and the electric booster is commanded on at 100% of its maximum speed. The shut-off valve (e.g. 193) is commanded closed. While not explicitly illustrated, it may be understood that at time t2, the throttle (e.g. 114) may be commanded fully closed, or at least substantially closed (e.g. within 10% or less of fully closed). With the electric booster directing compressed air (positive pressure with respect to atmospheric pressure) to the evaporative emissions system, pressure in the evaporative emissions system increases between time t2 and t3. However, at time t3, pressure in the evaporative emissions system begins dropping, and continues to drop to atmospheric pressure between time t3 and t4, while the electric booster continues to direct positive pressure to the evaporative emissions system. In other words, between time t3 and t4, dust and/or debris is being removed from the air filter via the positive pressure directed to the evaporative emissions system. At time t4, with the pressure near (e.g. within a threshold of) atmospheric pressure, conditions are no longer indicated to be met for conducting the air filter cleaning diagnostic (plot 940). Accordingly, the V1 valve is commanded fully closed, and the electric booster is commanded off (e.g. is deactivated). The shut-off valve is commanded open. While not explicitly illustrated, the throttle may be returned to the position it was in prior to conducting the diagnostic. Between time t4 and t5, pressure in the evaporative emissions system remains near atmospheric pressure, due at least in part to the air filter cleaning diagnostic which reduced the amount of dust and/or debris from the air filter during the diagnostic.

In this way, a positive pressure with respect to atmospheric pressure may be introduced to a vehicle fuel system and/or evaporative emissions system for conducting one or more diagnostics, for vehicle systems that include dual-path purge systems and further include two-stage turbo engines. The positive pressure may be introduced under conditions where the engine is not combusting air and fuel, and may be introduced without a pump positioned in the evaporative emissions system. Such systems and methodology may be particularly relevant for hybrid vehicle systems with limited engine run time. Furthermore, introduction of the positive pressure may enable diagnostics to be conducted that may not be able to be effectively conducted via the application of a negative pressure to the fuel system and/or evaporative emissions system. In one example, positive pressure may supress vaporization in the fuel system and/or evaporative emissions system when conducting a diagnostic for presence or absence of undesired evaporative emissions. Thus, such a diagnostic may be conducted under conditions where vaporization rates are expected to be greater than a threshold vaporization rate, the vaporization rate dependent on one or more of fuel system temperature, ambient temperature, fuel level, parking conditions that may influence fuel vaporization (e.g. hot ground surface), etc., where if the diagnostic were conducted relying on negative pressure introduction to the fuel system and/or evaporative emissions system, the results may not be reliable (e.g. vaporization may adversely impact pressure bleed up analysis). Furthermore, introduction of positive pressure to the vehicle fuel system and/or evaporative emissions system may enable a determination as to whether one or more quick connects are not properly latched or locked, whereas if negative pressure were introduced to the fuel system and/or evaporative emissions system, the quick connects may temporarily seal, thus the diagnostic may falsely indicate that the quick connects were properly latched or locked, when in fact that is not the case. Still further, introduction of positive pressure to the fuel system and/or evaporative emissions system may enable an air filter positioned in a vent line of the evaporative emissions system to be readily cleaned, as opposed to if negative pressure were introduced to the evaporative emissions system.

The technical effect is to recognize that for vehicles that include dual path purge systems and two stage engine, an electric booster positioned in the intake of the engine may be utilized to introduce positive pressure to the fuel system and/or evaporative emissions system, via a conduit that includes a valve, where the conduit is introduced either upstream of the ejector system or downstream of the ejector system. Thus, a technical effect is to recognize that positive pressure may be introduced to the fuel system and/or evaporative emissions system under conditions when the engine is not combusting air and fuel, which may be particularly relevant to hybrid electric vehicles with limited engine run-time.

The systems and methods discussed herein may enable one or more systems and one or more methods. In on example, a method for a vehicle comprises receiving purge gasses from an evaporative emissions system selectively fluidically coupled to a fuel system, under boosted engine operation and natural aspiration engine operation; activating an electric compressor positioned in an engine intake to direct a positive pressure with respect to atmospheric pressure to the fuel system and/or evaporative emissions system; and conducting a diagnostic based on the positive pressure. In a first example of the method, the method further comprises activating the electric compressor under conditions where the engine is not combusting air and fuel. A second example of the method optionally includes the first example, and further includes wherein activating the electric compressor includes providing power for the electric compressor via an onboard energy storage device, or under conditions where the vehicle receives energy from a source external to the vehicle. A third example of the method optionally includes any one or more or each of the first through second examples, and further includes wherein directing the positive pressure to the fuel system and/or evaporative emissions system includes directing the positive pressure through an ejector positioned in an ejector system, and then directing the positive pressure to the fuel system and/or evaporative emissions system, or directing the positive pressure to the fuel system and/or evaporative emissions system without first directing the positive pressure through the ejector positioned in the ejector system. A fourth example of the method optionally includes any one or more or each of the first through third examples, and further comprises commanding closed an air intake throttle positioned in the engine intake, commanding closed a shut-off valve positioned in a conduit downstream of the ejector, and commanding closed a canister purge valve positioned in a purge line coupled to the ejector, for directing the positive pressure to the fuel system and/or evaporative emissions system. A fifth example of the method optionally includes any one or more or each of the first through fourth examples, and further includes wherein the diagnostic based on the positive pressure includes a test for a presence or absence of undesired evaporative emissions stemming from the fuel system and/or evaporative emissions system. A sixth example of the method optionally includes any one or more or each of the first through fifth examples, and further includes wherein the diagnostic based on the positive pressure includes a test to determine whether one or more quick connects that are utilized to couple one or more fluid-carrying components of the fuel system and/or evaporative emissions system are latched or locked, by monitoring for a sudden decrease in pressure in the fuel system and/or evaporative emissions system while the positive pressure is being directed to the fuel system and/or evaporative emissions system. A seventh example of the method optionally includes any one or more or each of the first through sixth examples, and further includes wherein the diagnostic based on the positive pressure includes an air filter cleaning diagnostic, where the air filter is positioned in a vent line of the evaporative emissions system, and where the positive pressure reduces an amount of dust and/or debris associated with the air filter. An eighth example of the method optionally includes any one or more or each of the first through seventh examples, and further includes wherein an electric compressor speed is variable for directing the positive pressure to the fuel system and/or evaporative emissions system as a function of the diagnostic relying on the positive pressure.

An example of a system for a hybrid vehicle comprises an evaporative emissions system selectively fluidically coupled to a fuel system via a fuel tank isolation valve, the evaporative emissions system including a fuel vapor storage canister selectively fluidically coupled to atmosphere via a canister vent valve positioned in a vent line, and selectively fluidically coupled to an intake of an engine via a dual-path fuel vapor canister purge system that includes at least a canister purge valve and an ejector system including an ejector; a throttle positioned in the intake of the engine; a first conduit that selectively fluidically couples the vent line of the evaporative emissions system at a position between the fuel vapor storage canister and the canister vent valve, to a second conduit that fluidically couples the ejector system to an air induction system, the first conduit selectively fluidically coupling the vent line to the second conduit via a first valve; an electric compressor positioned in an intake passage of the engine; a shut-off valve positioned downstream of the ejector system between the ejector system and the air induction system; a pressure sensor configured to measure pressure in the fuel system and/or evaporative emissions system; and a controller with computer readable instructions stored on non-transitory memory that when executed, cause the controller to: command fully open the first valve and command closed the throttle, canister purge valve, and the shut-off valve, and activate the electric compressor to route a positive pressure with respect to atmospheric pressure to the evaporative emissions system in order to conduct a diagnostic that relies on the positive pressure. In a first example of the system, the system further comprises an air filter positioned in the vent line between the canister vent valve and atmosphere; wherein the controller stores further instructions to command closed the fuel tank isolation valve, and command open the canister vent valve just prior to routing the positive pressure to the evaporative emissions system; and in response to an indication via the pressure sensor that pressure in the evaporative emissions system is steadily decreasing during the routing, continue the routing until pressure in the evaporative emissions system is within a threshold of atmospheric pressure. A second example of the system optionally includes the first example, and further includes wherein the controller stores further instructions to activate the electric booster at a speed greater than or equal to 90% of its maximum speed to route the positive pressure to the evaporative emissions system. A third example of the system optionally includes any one or more or each of the first and second examples, and further comprises one or more quick connects to couple one or more fluid-carrying components of the fuel system and/or evaporative emissions system; wherein the controller stores further instructions to command closed the canister vent valve, and command open the fuel tank isolation valve just prior to routing the positive pressure to the evaporative emissions system; and indicate that the one or more quick connects are not properly latched or locked in response to a rapid decrease in pressure in the evaporative emissions system and fuel system during the routing. A fourth example of the system optionally includes any one or more or each of the first through third examples, and further includes wherein the controller stores further instructions to activate the electric booster at a speed greater than or equal to 90% of its maximum speed to route the positive pressure to the evaporative emissions system. A fifth example of the system optionally includes any one or more or each of the first through fourth examples, and further includes wherein the engine is not combusting air and fuel while the electric compressor is activated to route the positive pressure to the evaporative emissions system. A sixth example of the method optionally includes any one or more or each of the first through fifth examples, and further includes wherein the controller stores further instructions to: just prior to routing the positive pressure to the evaporative emissions system, command closed the canister vent valve, and command open the fuel tank isolation valve; and in response to a positive pressure threshold being reached in the evaporative emissions system and the fuel system during the routing, command fully closed the first valve and indicate an absence of a source of undesired evaporative emissions stemming from the fuel system and the evaporative emissions system in response to pressure in the evaporative emissions system remaining above a pressure bleed down threshold for a predetermined time period.

Another example of a system for a hybrid vehicle comprises an evaporative emissions system selectively fluidically coupled to a fuel system via a fuel tank isolation valve, the evaporative emissions system including a fuel vapor storage canister selectively fluidically coupled to atmosphere via a canister vent valve positioned in a vent line, and selectively fluidically coupled to an intake of an engine via a dual-path fuel vapor canister purge system that includes at least a canister purge valve and an ejector system including an ejector; a throttle positioned in the intake of the engine; a shut-off valve positioned between the ejector system and an air induction system; a first conduit that selectively fluidically couples the vent line of the evaporative emissions system at a position between the fuel vapor storage canister and the canister vent valve, to a second conduit that fluidically couples the ejector system to an intake passage of the engine at a position between a charge air cooler and a throttle positioned in the intake passage, the first conduit selectively fluidically coupling the vent line to the second conduit via a first valve and further including a restriction orifice between the first valve and the second conduit; and a controller with computer readable instructions stored on non-transitory memory that when executed, cause the controller to: with the engine not combusting air and fuel, command fully open the first valve, command closed the throttle, canister purge valve, and shut-off valve, and activate the electric compressor to route a positive pressure with respect to atmospheric pressure to the evaporative emissions system in order to conduct a diagnostic that relies on the positive pressure. In a first example of the system, the system further includes wherein an outlet of the ejector is welded to the air induction system. A second example of the system optionally includes the first example, and further comprises one or more quick connects configured to coupled one or more fluid-carrying components of the fuel system and/or evaporative emissions system; and wherein the controller stores further instructions to, just prior to routing the positive pressure to the evaporative emissions system, command closed the canister vent valve, and command open the fuel tank isolation valve, where the diagnostic includes a test for a presence of undesired evaporative emissions or where the diagnostic includes a test for determining whether the one or more quick connects are properly latched or locked. A third example of the system optionally includes any one or more or each of the first and second examples, and further comprises an air filter positioned in the vent line between the canister vent valve and atmosphere; and wherein the controller stores further instructions to, just prior to routing the positive pressure to the evaporative emissions system, command open the canister vent valve, and command closed the fuel tank isolation valve, where the diagnostic includes a procedure to remove dust and/or debris from the air filter via the routing of the positive pressure. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
    directing purge gases to an engine from an evaporative emissions system selectively fluidically coupled to a fuel system via a fuel tank isolation valve, under boosted engine operation and natural aspiration engine operation;
    commanding closed an air intake throttle positioned in an engine intake, commanding closed a shut-off valve positioned in a first conduit coupled between an ejector and the engine intake, commanding closed a canister purge valve positioned in a purge line coupled between the evaporative emissions system and the ejector, and commanding open a valve V1 positioned in a second conduit coupled between the ejector and a vent line of the evaporative emissions system;
    activating an electric compressor positioned in the engine intake to direct a positive pressure with respect to atmospheric pressure to the fuel system and/or evaporative emissions system; and
    conducting a diagnostic that relies on the positive pressure via a pressure sensor, the diagnostic including monitoring pressure build-up or decay.

2. The method of claim 1, wherein activating the electric compressor is performed under conditions where the engine is not combusting air and fuel.

3. The method of claim 1, wherein activating the electric compressor includes providing power for the electric compressor via an onboard energy storage device, or under conditions where the vehicle is receiving energy from a source external to the vehicle.

4. The method of claim 1, wherein the diagnostic includes a test for a presence or absence of undesired evaporative emissions stemming from the fuel system and/or evaporative emissions system.

5. The method of claim 1, wherein the diagnostic includes a test to determine whether one or more quick connects that are utilized to couple one or more fluid-carrying components of the fuel system and/or evaporative emissions system are latched or locked, by monitoring for a sudden decrease in pressure in the fuel system and/or evaporative emissions system while the positive pressure is being directed to the fuel system and/or evaporative emissions system.

6. The method of claim 1, wherein the diagnostic includes an air filter cleaning diagnostic, where an air filter is positioned in the vent line of the evaporative emissions system, and where the positive pressure reduces an amount of dust and/or debris associated with the air filter.

7. The method of claim 1, wherein a speed of the electric compressor is variable for directing the positive pressure to the fuel system and/or evaporative emissions system as a function of the diagnostic.

8. A system for a hybrid vehicle, comprising:
    an evaporative emissions system selectively coupled to a fuel system via a fuel tank isolation valve, the evaporative emissions system including a fuel vapor storage canister selectively coupled to atmosphere via a canister vent valve positioned in a vent line of the evaporative emissions system, and selectively coupled to an air intake of an engine via a dual-path fuel vapor canister purge system that includes at least a canister purge valve positioned in a purge line coupled between the evaporative emissions system and an ejector;
    a throttle positioned in the air intake of the engine;
    a shut-off valve positioned in a first conduit coupled between the ejector and the air intake of the engine;
    a valve V1 positioned in a second conduit coupled between the ejector and the vent line of the evaporative emissions system;
    an electric compressor positioned in the air intake of the engine;
    a pressure sensor configured to measure pressure in the fuel system and/or evaporative emissions system; and
    a controller with computer readable instructions stored on non-transitory memory that when executed, cause the controller to:
        command fully open the valve V1 and command closed the throttle, canister purge valve, and shut-off valve, and activate the electric compressor to route a positive pressure with respect to atmospheric pressure to the fuel system and/or evaporative emissions system in order to conduct a diagnostic that relies on the positive pressure via the pressure sensor, the diagnostic including monitoring pressure build-up or decay.

9. The system of claim 8, further comprising:
    an air filter positioned in the vent line between the canister vent valve and atmosphere;
    wherein the controller stores further instructions to command closed the fuel tank isolation valve and command open the canister vent valve prior to routing the positive pressure to the fuel system and/or evaporative emissions system; and
    in response to an indication via the pressure sensor that pressure in the fuel system and/or evaporative emissions system is steadily decreasing during the routing of the positive pressure, continue the routing of the positive pressure until pressure in the fuel system and/or evaporative emissions system is within a threshold of atmospheric pressure.

10. The system of claim 9, wherein the controller stores further instructions to activate the electric compressor at a speed greater than or equal to 90% of its maximum speed to route the positive pressure to the fuel system and/or evaporative emissions system.

11. The system of claim 8, further comprising:
one or more quick connects to couple one or more fluid-carrying components of the fuel system and/or evaporative emissions system;
wherein the controller stores further instructions to command closed the canister vent valve and command open the fuel tank isolation valve prior to routing the positive pressure to the fuel system and/or evaporative emissions system; and
indicate that the one or more quick connects are not properly latched or locked in response to a rapid decrease in pressure in the fuel system and/or evaporative emissions system during the routing of the positive pressure.

12. The system of claim 11, wherein the controller stores further instructions to activate the electric compressor at a speed greater than or equal to 90% of its maximum speed to route the positive pressure to the fuel system and/or evaporative emissions system.

13. The system of claim 8, wherein the engine is not combusting air and fuel while the electric compressor is activated to route the positive pressure to the fuel system and/or evaporative emissions system.

14. The system of claim 8, wherein the controller stores further instructions to:
prior to routing the positive pressure to the fuel system and/or evaporative emissions system, command closed the canister vent valve and command open the fuel tank isolation valve; and
in response to a positive pressure threshold being reached in the fuel system and/or evaporative emissions system during the routing of the positive pressure, command fully closed the valve V1, and indicate an absence of a source of undesired evaporative emissions stemming from the fuel system and/or evaporative emissions system in response to pressure in the fuel system and/or evaporative emission system remaining above a pressure bleed down threshold for a predetermined time period.

15. A system for a hybrid vehicle, comprising:
an evaporative emissions system selectively coupled to a fuel system via a fuel tank isolation valve, the evaporative emissions system including a fuel vapor storage canister selectively coupled to atmosphere via a canister vent valve positioned in a vent line of the evaporative emissions system, and selectively coupled to an air intake of an engine via a dual-path fuel vapor canister purge system that includes at least a canister purge valve positioned in a purge line coupled between the evaporative emissions system and an ejector;
a throttle and an electric compressor positioned in the air intake of the engine;
a shut-off valve positioned in a first conduit coupled between the ejector and the air intake of the engine;
a valve V1 positioned in a second conduit coupled between the ejector and the vent line of the evaporative emissions system, the second conduit configured to couple the ejector to the air intake of the engine at a position between a charge air cooler and the throttle, the second conduit including a restriction orifice positioned between the valve V1 and the air intake of the engine;
a pressure sensor configured to measure pressure in the fuel system and/or evaporative emissions system; and
a controller with computer readable instructions stored on non-transitory memory that when executed, cause the controller to:
with the engine not combusting air and fuel, command fully open the valve V1, command closed the throttle, canister purge valve, and shut-off valve, and activate the electric compressor to route a positive pressure with respect to atmospheric pressure to the fuel system and/or evaporative emissions system in order to conduct a diagnostic that relies on the positive pressure via the pressure sensor, the diagnostic including monitoring pressure build-up or decay.

16. The system of claim 15, wherein an outlet of the ejector is welded to the air intake of the engine.

17. The system of claim 15, further comprising:
one or more quick connects configured to couple one or more fluid-carrying components of the fuel system and/or evaporative emissions system; and
wherein the controller stores further instructions to, prior to routing the positive pressure to the fuel system and/or evaporative emissions system, command closed the canister vent valve and command open the fuel tank isolation valve, where the diagnostic includes a test for a presence of undesired evaporative emissions or a test for determining whether the one or more quick connects are properly latched or locked.

18. The system of claim 15, further comprising an air filter positioned in the vent line between the canister vent valve and atmosphere; and
wherein the controller stores further instructions to, prior to routing the positive pressure to the fuel system and/or evaporative emissions system, command open the canister vent valve and command closed the fuel tank isolation valve, where the diagnostic includes a procedure for removing dust and/or debris from the air filter via the routing of the positive pressure.

* * * * *